US009045163B2

(12) United States Patent
Theodore

(10) Patent No.: US 9,045,163 B2
(45) Date of Patent: Jun. 2, 2015

(54) UNIVERSAL CHASSIS APPARATUS FOR AUTOMOTIVE VEHICLE

(71) Applicant: Theodore & Associates LLC, Birmingham, MI (US)

(72) Inventor: Chris P. Theodore, Birmingham, MI (US)

(73) Assignee: THEODORE & ASSOCIATES, Birmingham, MI (US)

( * ) Notice: Subject to any disclaimer, the term of this patent is extended or adjusted under 35 U.S.C. 154(b) by 126 days.

(21) Appl. No.: 13/950,060

(22) Filed: Jul. 24, 2013

(65) Prior Publication Data

US 2013/0306394 A1    Nov. 21, 2013

Related U.S. Application Data

(63) Continuation-in-part of application No. 13/397,329, filed on Feb. 15, 2012, now Pat. No. 8,496,268, which is a continuation-in-part of application No. 12/019,490, filed on Jan. 24, 2008, now abandoned.

(60) Provisional application No. 60/897,771, filed on Jan. 26, 2007.

(51) Int. Cl.
| | |
|---|---|
| *B62D 21/00* | (2006.01) |
| *B62D 21/02* | (2006.01) |
| *B60K 6/40* | (2007.10) |
| *B60K 6/50* | (2007.10) |
| *B60K 17/22* | (2006.01) |
| *B60K 17/34* | (2006.01) |
| *B62D 21/04* | (2006.01) |
| *B60K 6/20* | (2007.10) |

(Continued)

(52) U.S. Cl.
CPC .............. *B62D 21/02* (2013.01); *Y10S 903/902* (2013.01); *Y02T 10/6265* (2013.01); *B60K 6/20* (2013.01); *B60K 6/40* (2013.01); *B60K 6/50* (2013.01); *B60K 7/0007* (2013.01); *B60K 17/04* (2013.01); *B60K 17/22* (2013.01); *B60K 17/34* (2013.01); *B62D 21/04* (2013.01)

(58) Field of Classification Search
USPC .............. 280/784, 798, 124.109; 296/187.08, 296/193.07, 203.01, 204, 205, 208; 180/311
See application file for complete search history.

(56) References Cited

U.S. PATENT DOCUMENTS

| | | |
|---|---|---|
| 1,991,619 A | 2/1935 | Donald |
| 2,079,218 A | 5/1937 | Kedwinka |
| 2,084,809 A | 6/1937 | Jencick |

(Continued)

OTHER PUBLICATIONS

Phelan, Mark; "Innovation in spotlight," Detroit Free Press, Apr. 10, 2011.

(Continued)

*Primary Examiner* — Toan To
(74) *Attorney, Agent, or Firm* — Harness, Dickey & Pierce, P.L.C.

(57) ABSTRACT

A universal chassis apparatus for an automotive vehicle includes a battery and/or fuel storage compartment in a rigid backbone structure. In another aspect, a vehicle chassis that incorporates the engine structure, transaxle structure and a backbone structure provided as a unitary structure onto which other components of a vehicle, such as suspension, steering, body and crash absorbers may be attached. The backbone structure is a closed tubular structure in which a relatively rigid drive shaft can be supported for rotational power delivery between the engine and the transaxle.

49 Claims, 34 Drawing Sheets

(51) Int. Cl.
 *B60K 7/00* (2006.01)
 *B60K 17/04* (2006.01)

(56) References Cited

U.S. PATENT DOCUMENTS

| | | | |
|---|---|---|---|
| 2,328,144 A | 8/1943 | Haspel | |
| 3,743,314 A | 7/1973 | Archer | |
| 4,232,755 A | 11/1980 | Dow | |
| 4,924,961 A * | 5/1990 | Bernardi | 180/374 |
| 4,966,408 A | 10/1990 | Yura et al. | |
| 5,042,870 A | 8/1991 | Yura et al. | |
| 5,314,205 A | 5/1994 | Glesmann | |
| 5,409,264 A | 4/1995 | Nakatani | |
| 5,460,236 A * | 10/1995 | Lewis et al. | 180/267 |
| 5,584,510 A | 12/1996 | Thuliez | |
| 6,015,022 A | 1/2000 | Thuliez | |
| 6,390,224 B1 | 5/2002 | Yoshida | |
| 6,460,889 B2 | 10/2002 | Iyanagi et al. | |
| 7,096,986 B2 | 8/2006 | Borroni-Bird et al. | |
| 7,201,247 B2 * | 4/2007 | Hurlburt | 180/233 |
| 7,370,886 B2 | 5/2008 | Luttinen et al. | |
| 7,380,830 B2 | 6/2008 | Mitsui et al. | |
| 7,836,999 B2 | 11/2010 | Kato | |
| 7,886,861 B2 | 2/2011 | Nozaki et al. | |
| 7,887,123 B2 | 2/2011 | Honji et al. | |
| 8,196,696 B2 | 6/2012 | Karube et al. | |
| 8,496,268 B2 * | 7/2013 | Theodore | 280/784 |
| 2004/0118627 A1 | 6/2004 | Ohtsuki et al. | |

OTHER PUBLICATIONS

Raynal, Wes; "A Good Guy with a Great Idea," Autoweek, May 2, 2011.
Lotus 49, Photo of Stressed Engine Transaxle, Wikipedia.
Google Image, Lotus 49.
Lotus 49 Assembly Drawings.
Lotus 49 Stressed Engine Description, Wikipedia.
Defechereux, Philippe, "Franco-American Love Story," Deutsch-Bonnet at Sebring Part II, http://www.velocetoday.com/deutsch-bonnet-at-sebring-part-ii, Mar. 21, 2008, 17 pages.

\* cited by examiner

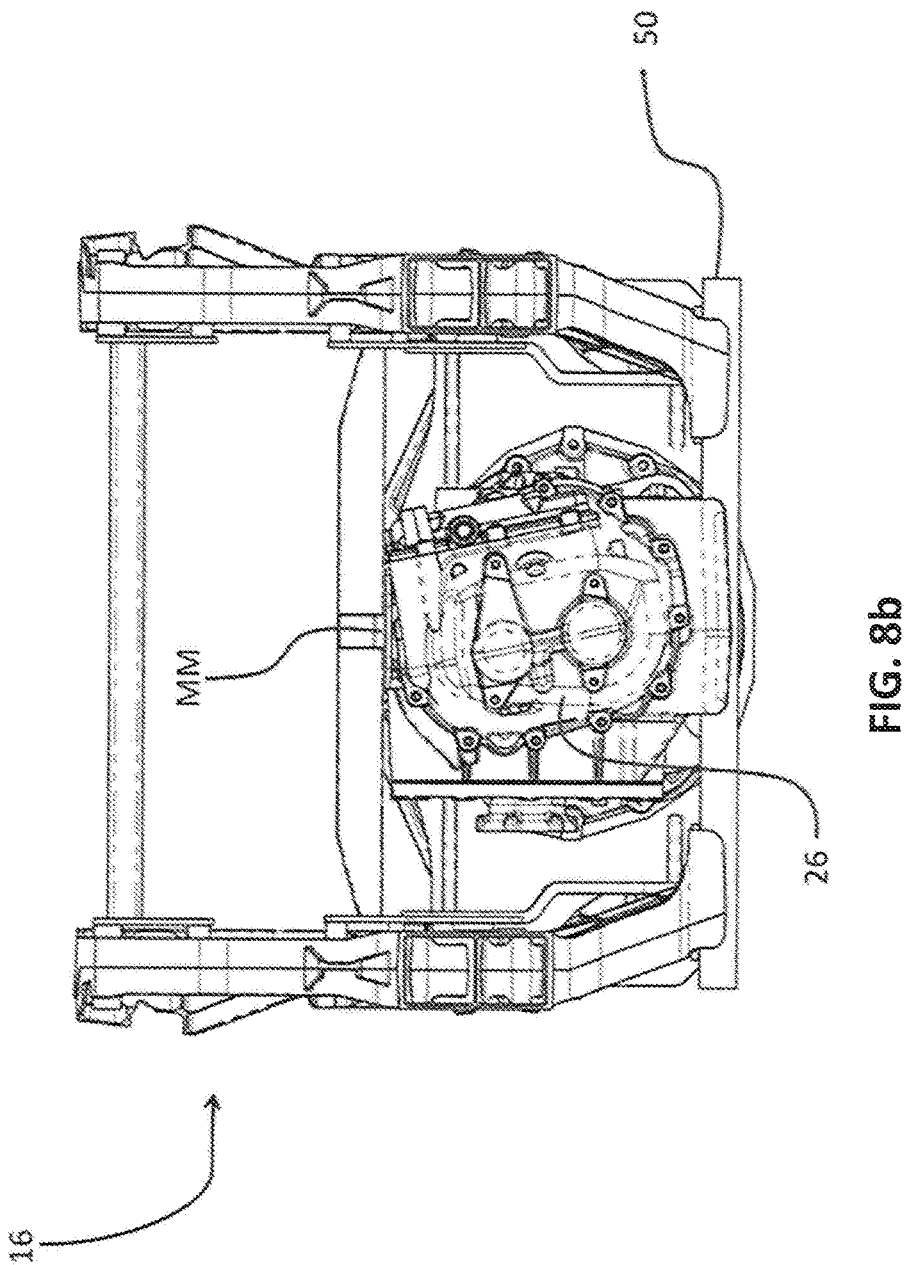

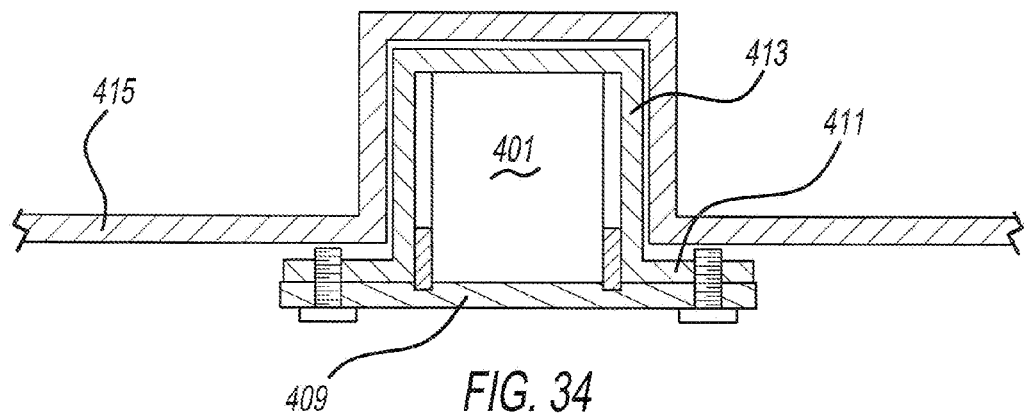
FIG. 34
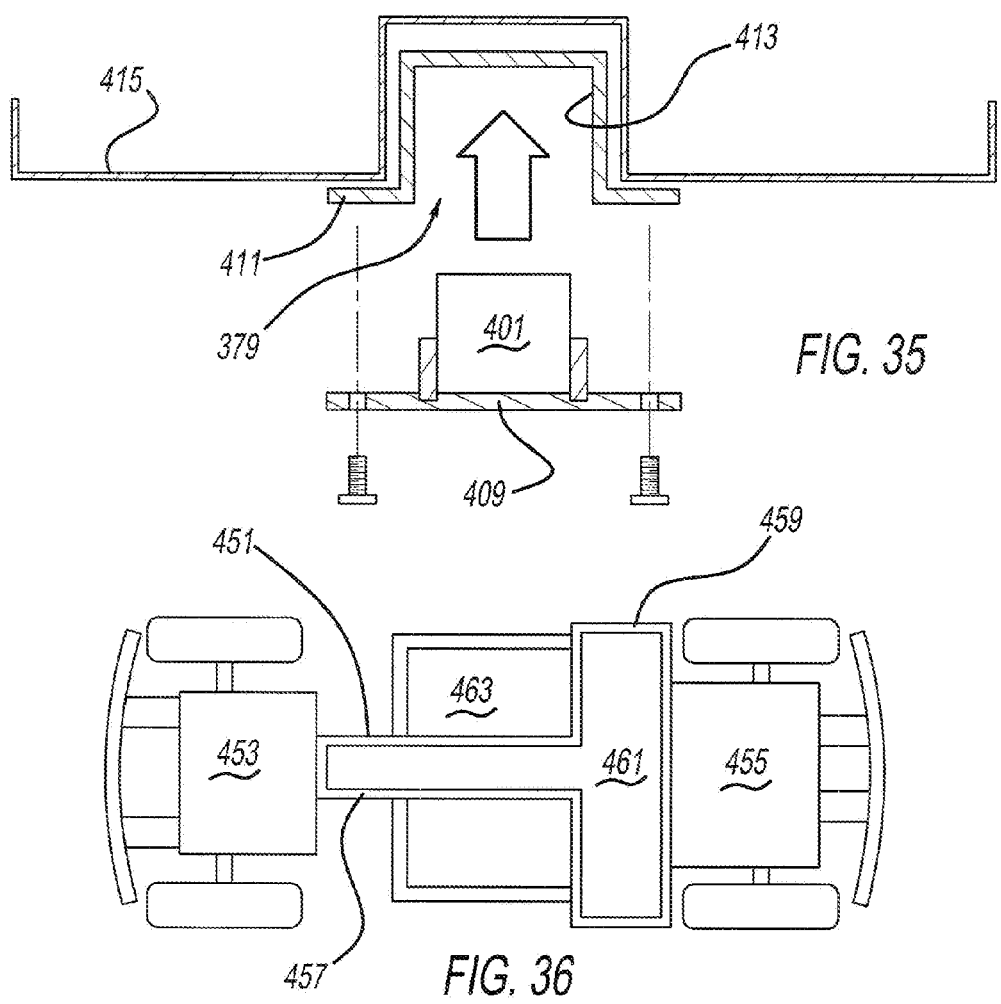
FIG. 35
FIG. 36

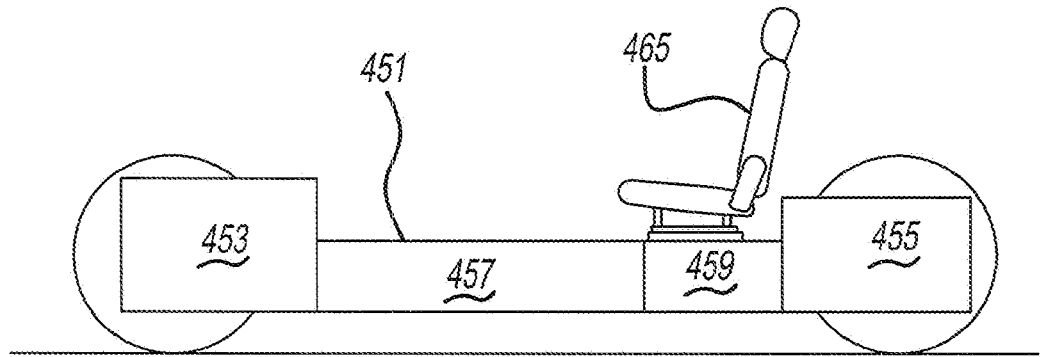
FIG. 37
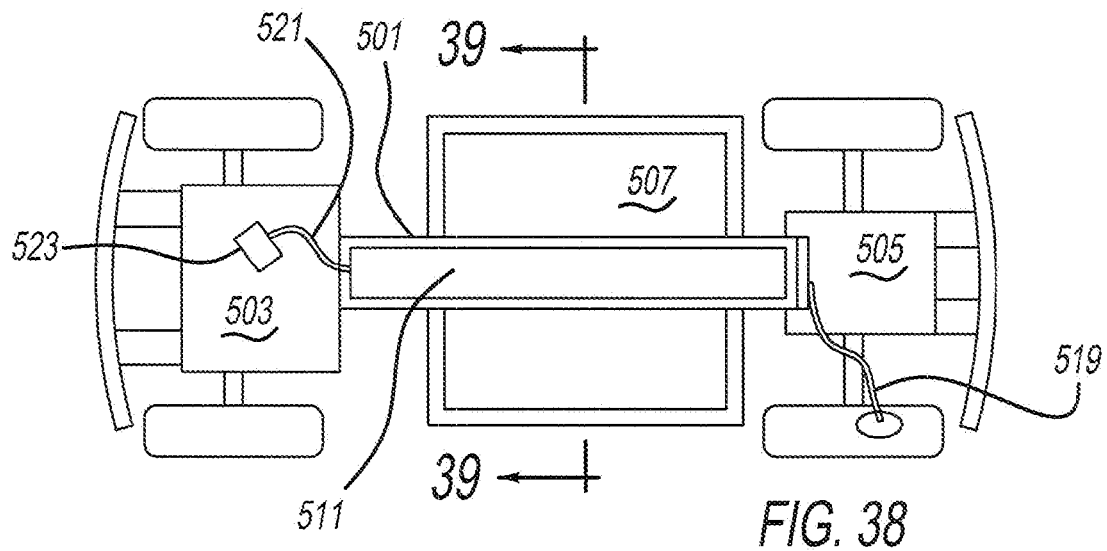
FIG. 38
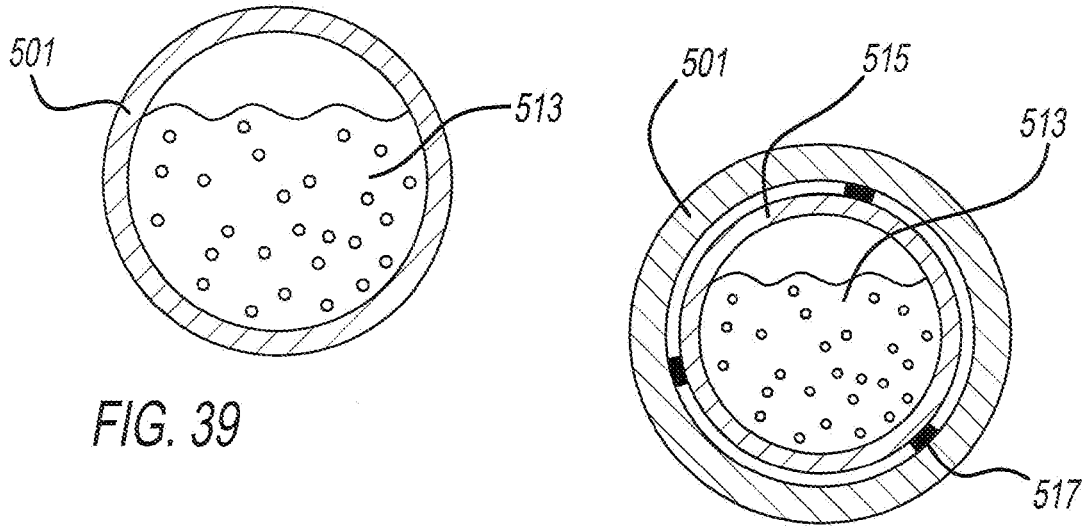
FIG. 39
FIG. 40

UNIVERSAL CHASSIS APPARATUS FOR AUTOMOTIVE VEHICLE

CROSS-REFERENCE TO RELATED APPLICATIONS

This application is a continuation-in-part of U.S. patent application Ser. No. 13/397,329, filed on Feb. 15, 2012, which is a continuation-in-part of U.S. patent application Ser. No. 12/019,490, filed on Jan. 24, 2008, which claims priority to U.S. Provisional Patent Application Ser. No. 60/897,771, filed on Jan. 26, 2007. The disclosure of the above applications are incorporated by reference herein.

FIELD

This invention is related to the field of automotive chassis design and more specifically to the area of interchangeable chassis for use with many models of vehicles.

BACKGROUND

The statements in this section merely provide background information related to the present disclosure and may not constitute prior art.

Traditionally, vehicles are made up on framed chassis or on a rigid uni-body chassis. These two types of chassis have both advantages and disadvantages when compared to each other and are well known in the automotive industry. A main deficiency attributed to each of the traditional chassis types is that they are not readily adaptable to a wide variety of vehicles without forcing major and expensive redesign work for each vehicle. As a result, almost every model of vehicle has a unique chassis that is unusable for other vehicle designs. The present invention is based on an attempt to address the disadvantages known in the two commonly used chassis types and also to provide a simple chassis that can be used in a wide variety of vehicle designs.

SUMMARY

In accordance with the present invention, a universal chassis apparatus for an automotive vehicle includes a battery and/or fuel storage compartment in a rigid backbone structure. In another aspect of the universal chassis apparatus, the unique features of this invention include the combination of a rigid backbone structure connecting front and rear structures (in the preferred embodiment, the front engine and rear transaxle), in combination with the front and rear suspensions rigidly affixed to the front and rear structures (or backbone mounting surfaces) such that suspension loads (in the preferred embodiment) stress the engine block and transaxle case, to create a complete, self-supporting chassis without the need for a separate frame, or the need to attach the front and rear suspension subassemblies to a rigid uni-body. In addition, the front and rear structures incorporate energy absorbing crash boxes affixed to the front and rear structures so that crash impact energy is transferred from the bumper beams, absorbed by the deformable energy boxes, and reacted by front and rear structures that transfer loads to the rigid backbone.

The problems solved by the present invention include an ability to attach different bodies, or body styles to the same uni-chassis; an ability to scale the uni-chassis to different size vehicles (e.g., wheelbase) by increasing or decreasing the length of the backbone structure. Weight savings are provided by using the backbone to serve the functions of (1) torsion and bending support for the chassis and (2) a torque tube to support drive torque from the engine to transaxle through a quill shaft mounted inside the backbone. Other problems solved by the present invention include an ability to de-couple chassis loads (e.g., ride and handling loads including drive, braking, steering) from (1) body loads and (2) absorb impact (crash) loads through the crash boxes to the backbone rather than the body; (3) an ability to create a "rolling chassis", before installation of the body structure; (4) an ability to reduce weight by stressing the normally unstressed engine and transaxle structures with chassis loads thereby reducing chassis structure and weight; and (5) an ability to optimize total vehicle weight, weight distribution and minimize polar moment of inertia (about the yaw axis) through minimization of weight and location of the major vehicle masses within the wheelbase of the vehicle.

Advantages of the present invention over prior constructions are simplicity (minimizing cost and manufacturing investment), weight reduction, reduction in polar moment of inertia about the yaw axis, and an ability to adapt to different bodies and body styles, and to create a rolling chassis. Other advantages include elimination of a traditional frame and its associated weight and cost, or the need to transfer suspension loads into a uni-body structure, which also effects weight and cost; and flexibility in creating unique chassis for different engines, transaxles and suspension components while maintaining the same uni-chassis architecture. Thus, a series of modules could be created for front, rear and backbone structures, allowing the creation of many different chassis using the three essential building blocks (front, backbone, and rear structures along with front and rear energy absorbing crash boxes). Still further advantages are an ability to scale the uni-chassis to different sizes and de-couple chassis loads from body loads. The backbone structure also provides a secure environment to pass electrical wiring, fuel lines and brakes lines through the bearing supports so that these components are protected from the environment and impact (crash) events.

The sales and market potential of this invention are particularly well suited to specialty vehicles since multiple vehicles can be made off the same uni-chassis as engineering and tooling investment can be spread among multiple models. This invention is also particularly well suited for Battery Electric Vehicles (BEVs) and Plug-in Hybrids (PHEVs), since the battery pack can be mounted inside the backbone—eliminating the need for a separate battery box—thus reducing cost and weight. Manufacturing investment is low. The uni-chassis is scaleable to different sizes. The uni-chassis is modular, in that different front, rear and backbone modules and energy absorbing crash boxes can be combined to create different chassis. The uni-chassis can be sold as a complete rolling chassis, or as three independent modules plus front and rear crash boxes, to the aftermarket, allowing others to create unique vehicles. For high volume production, this invention continues to offer advantages of lower cost, weight and manufacturing investment.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 4 is a cross-sectional view of the universal chassis taken along line 4-4 of FIG. 3a;

FIG. 7 is a side view of the universal chassis shown coupled to the rear structure depicting the rigid attachment of the transaxle shown in FIG. 2a;

FIG. 8b is a detail rear view of the transaxle and rear structure;

Figure 10:
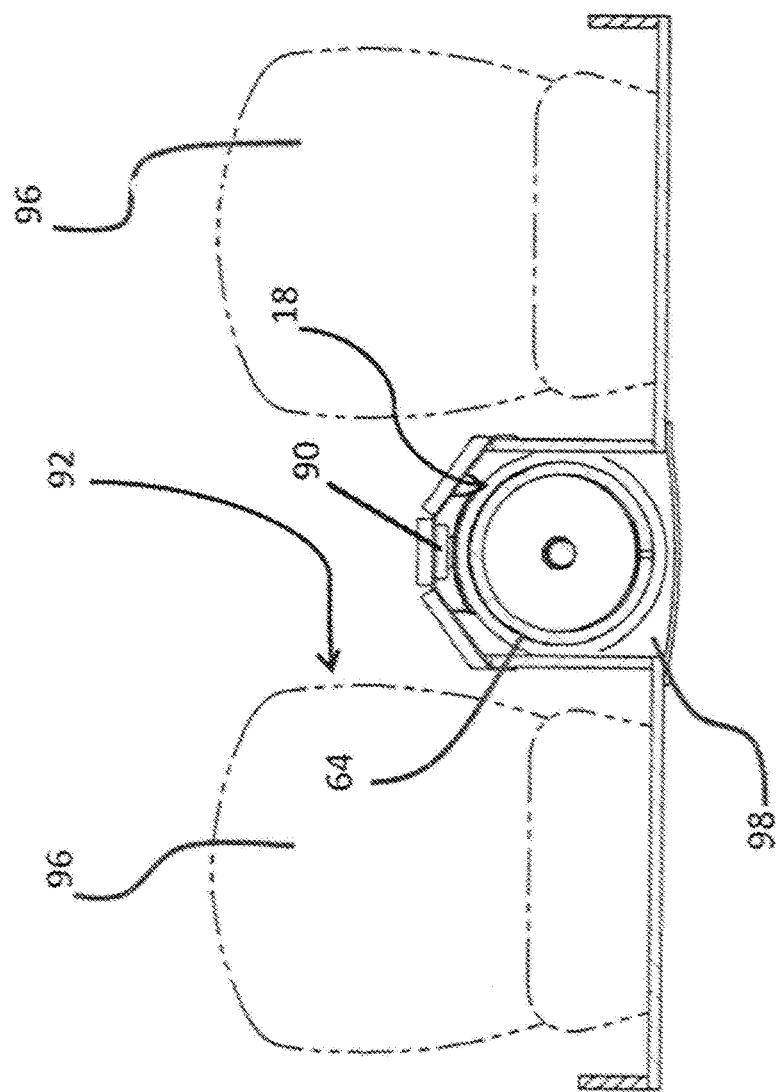

FIG. 10 is a cross-sectional view of an exemplary universal chassis represented as being associated with a vehicle body; the body is isolated from the Uni-Chassis by body mounts. As shown, the body floor pan encapsulates the backbone with a floor pan tunnel that is capped from the bottom by an undertray, so as to create a closed section. This is done so that side impact forces to the body during crash impacts are transferred to, and reacted by the Uni-Chassis backbone.

Figure 11:
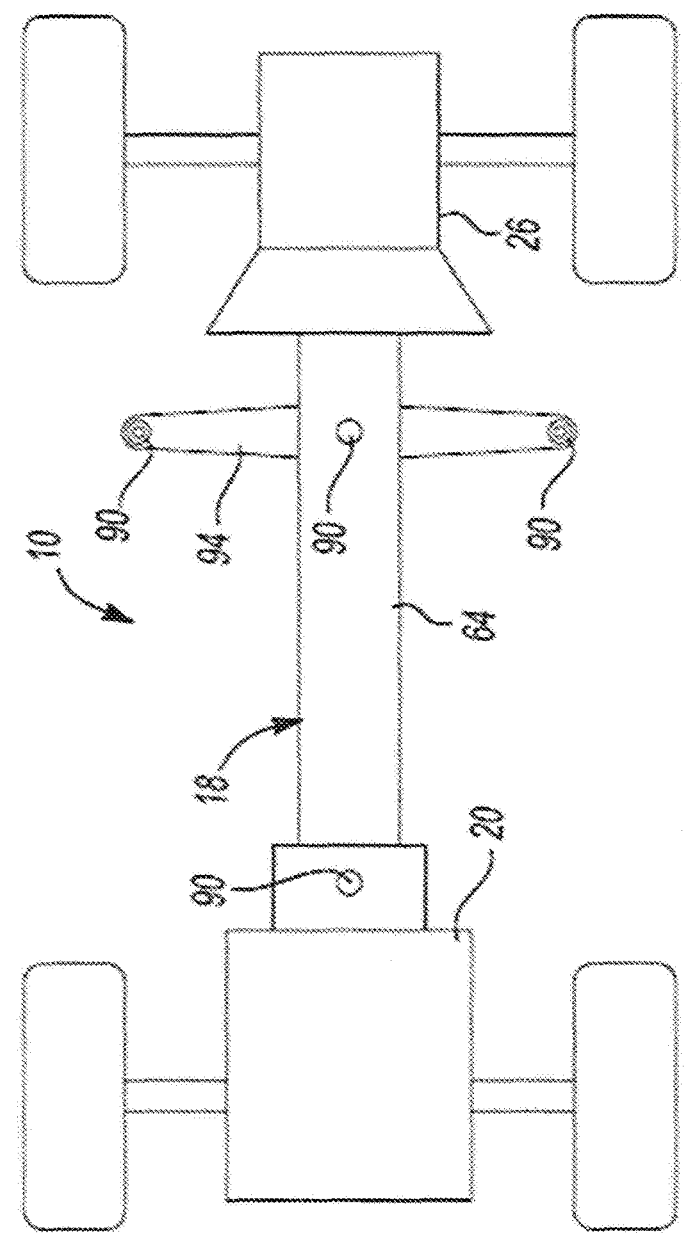
Figure 12:
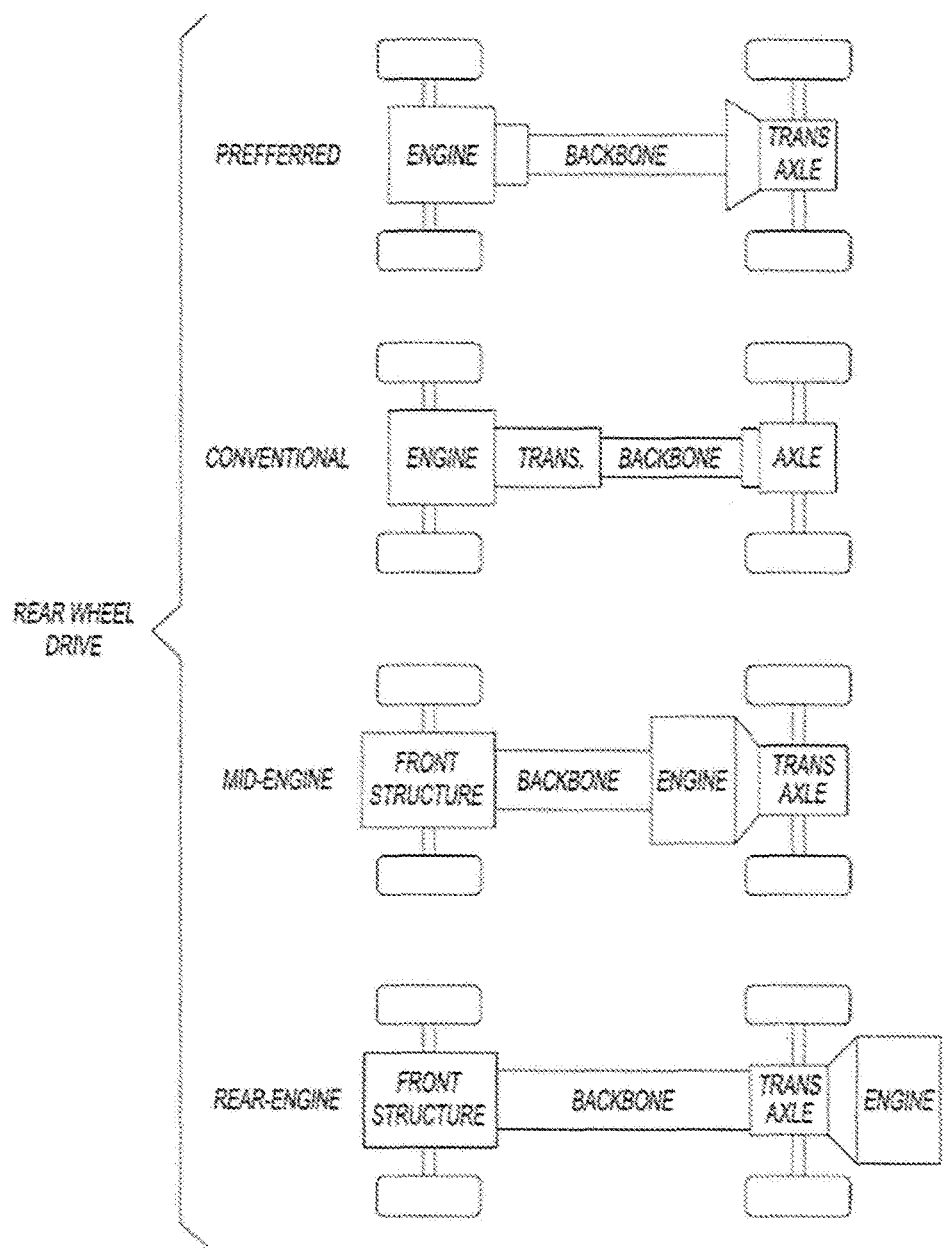
Figure 13:
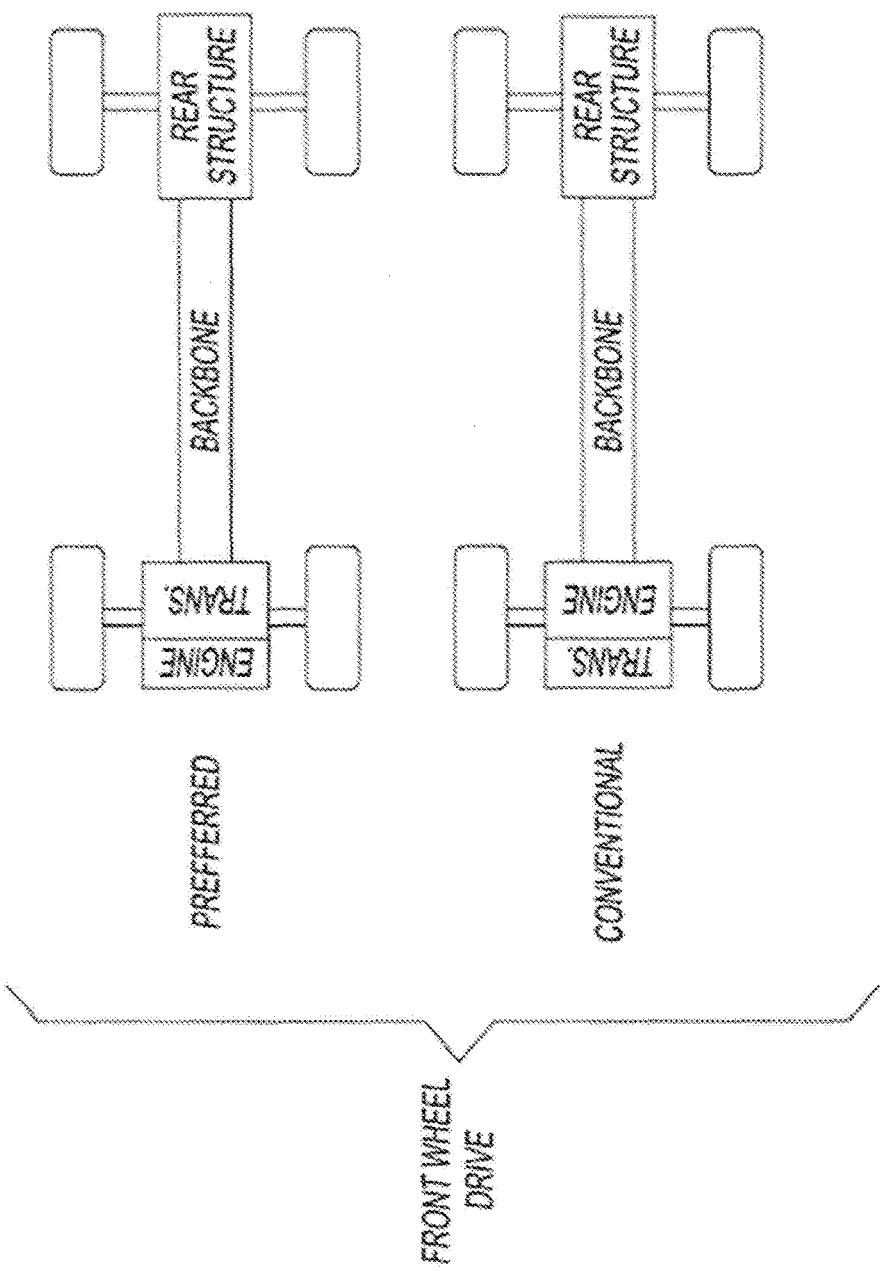
Figure 14:
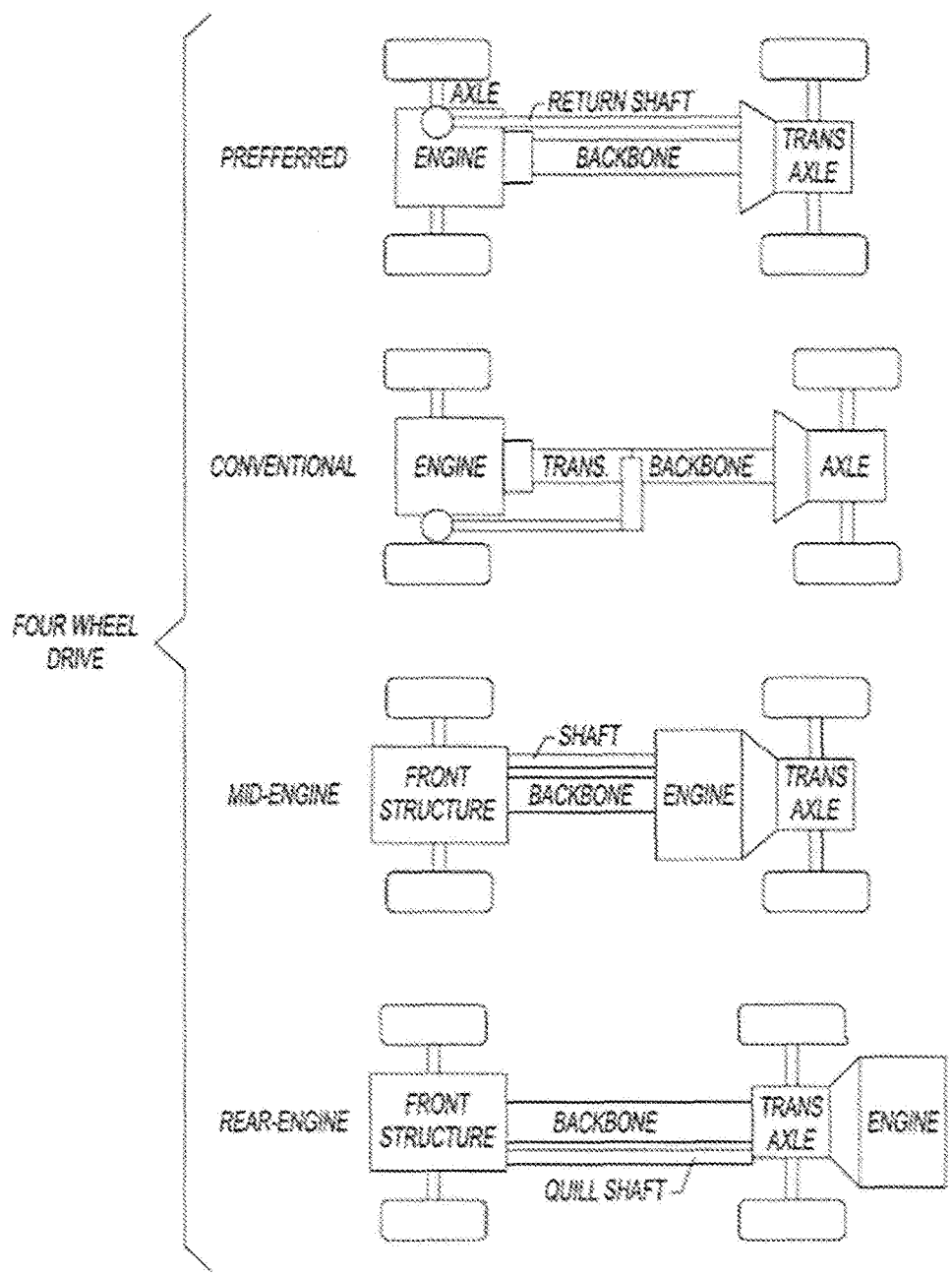
Figure 15:
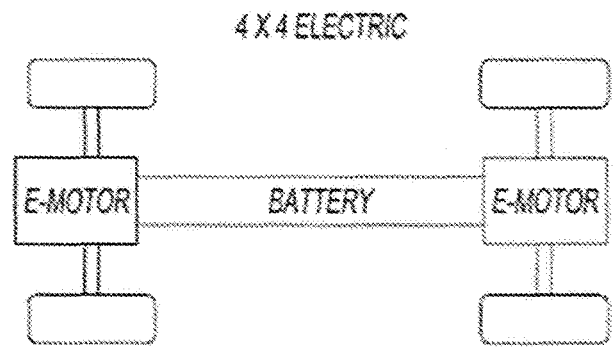
Figure 16:
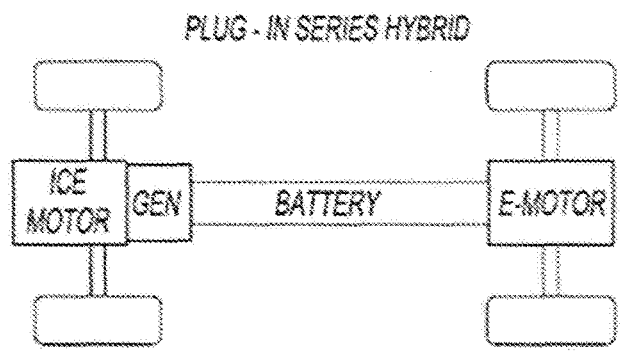
Figure 17:
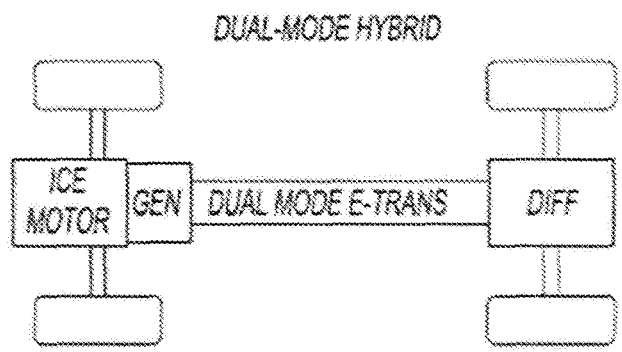
Figure 18:
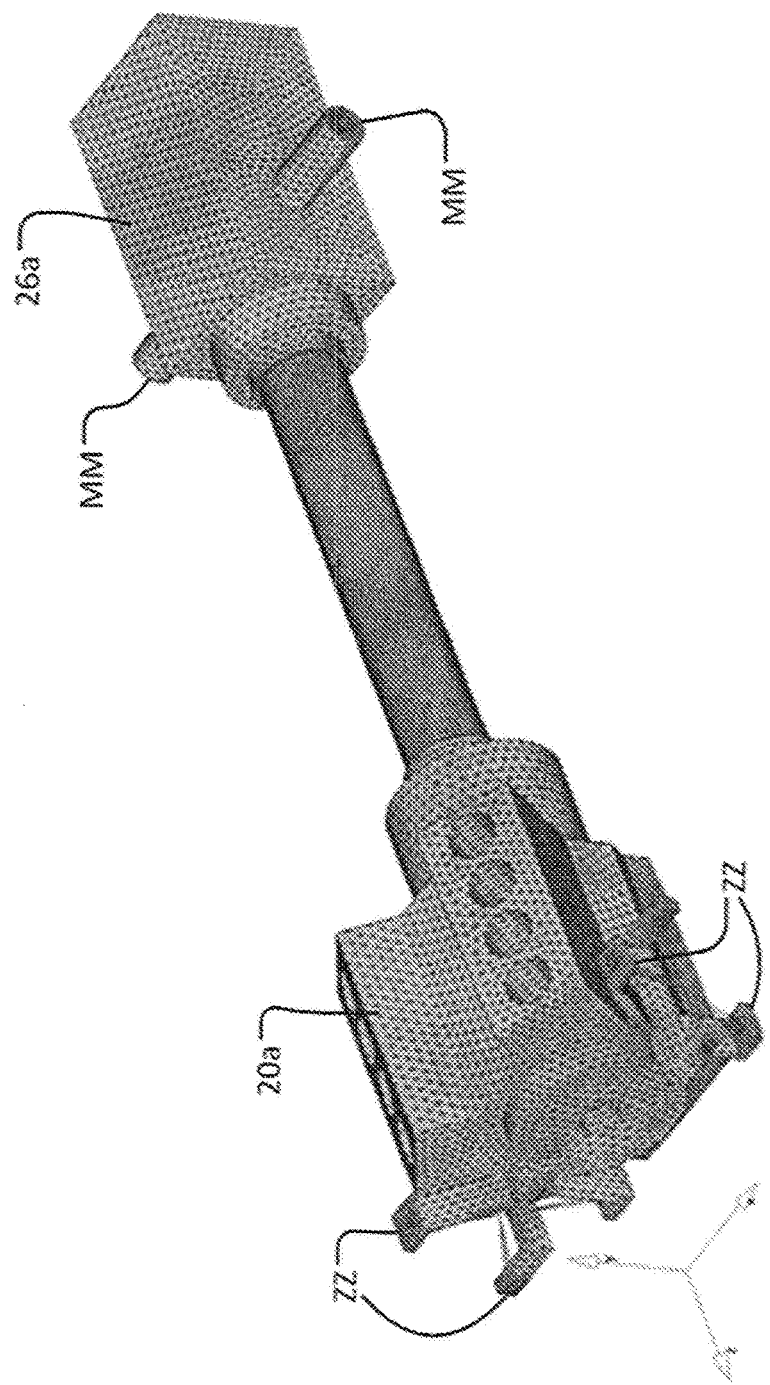
Figure 19:
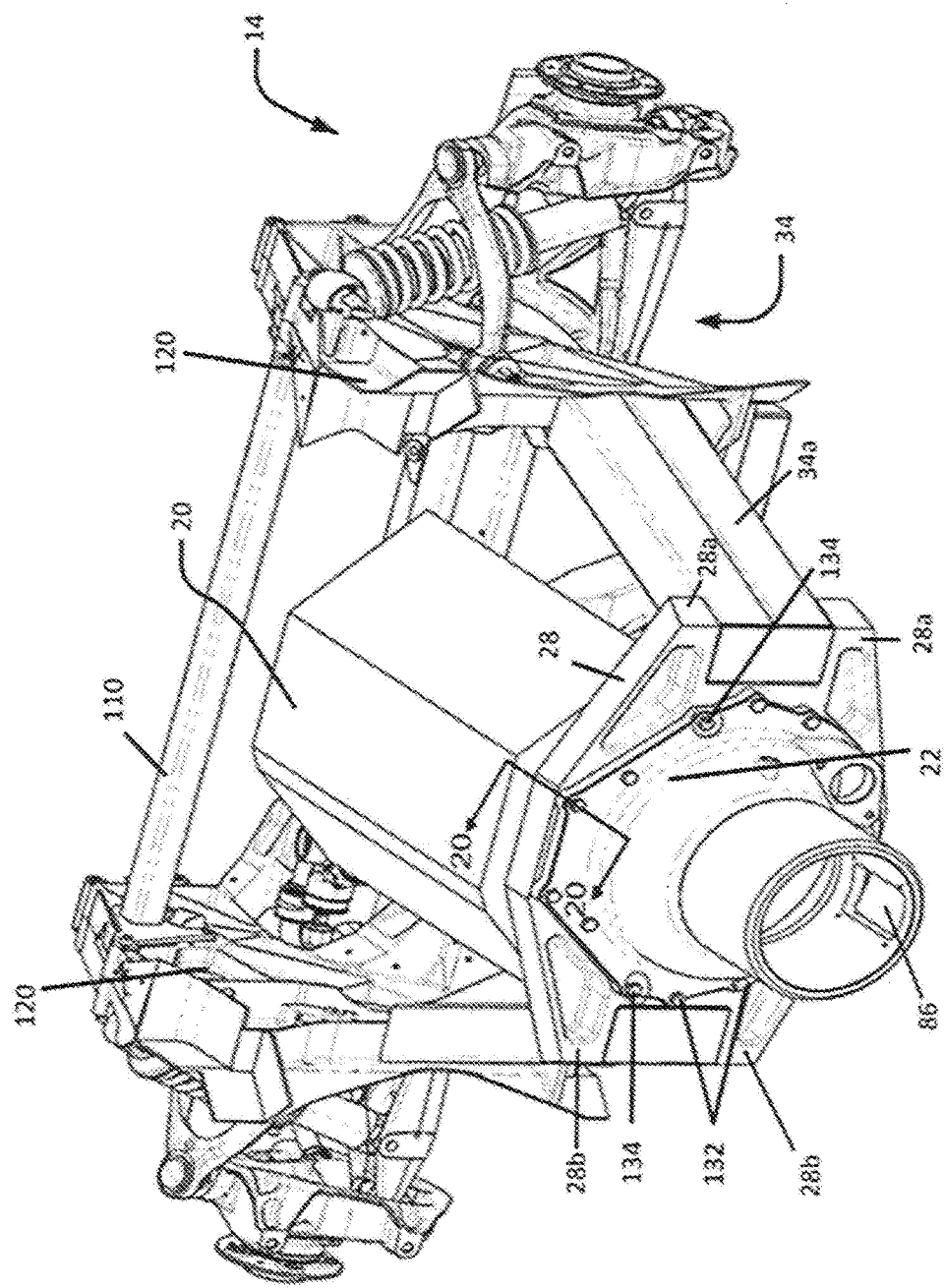
Figure 20:
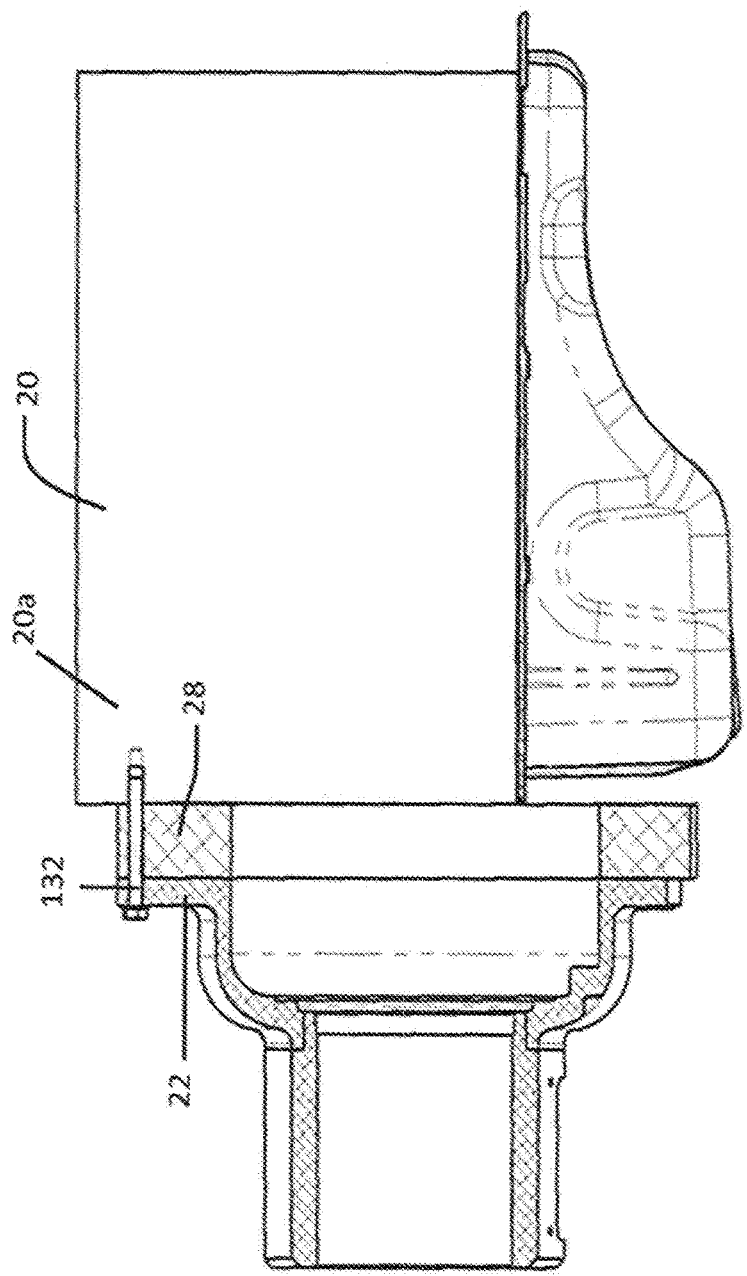
Figure 21:
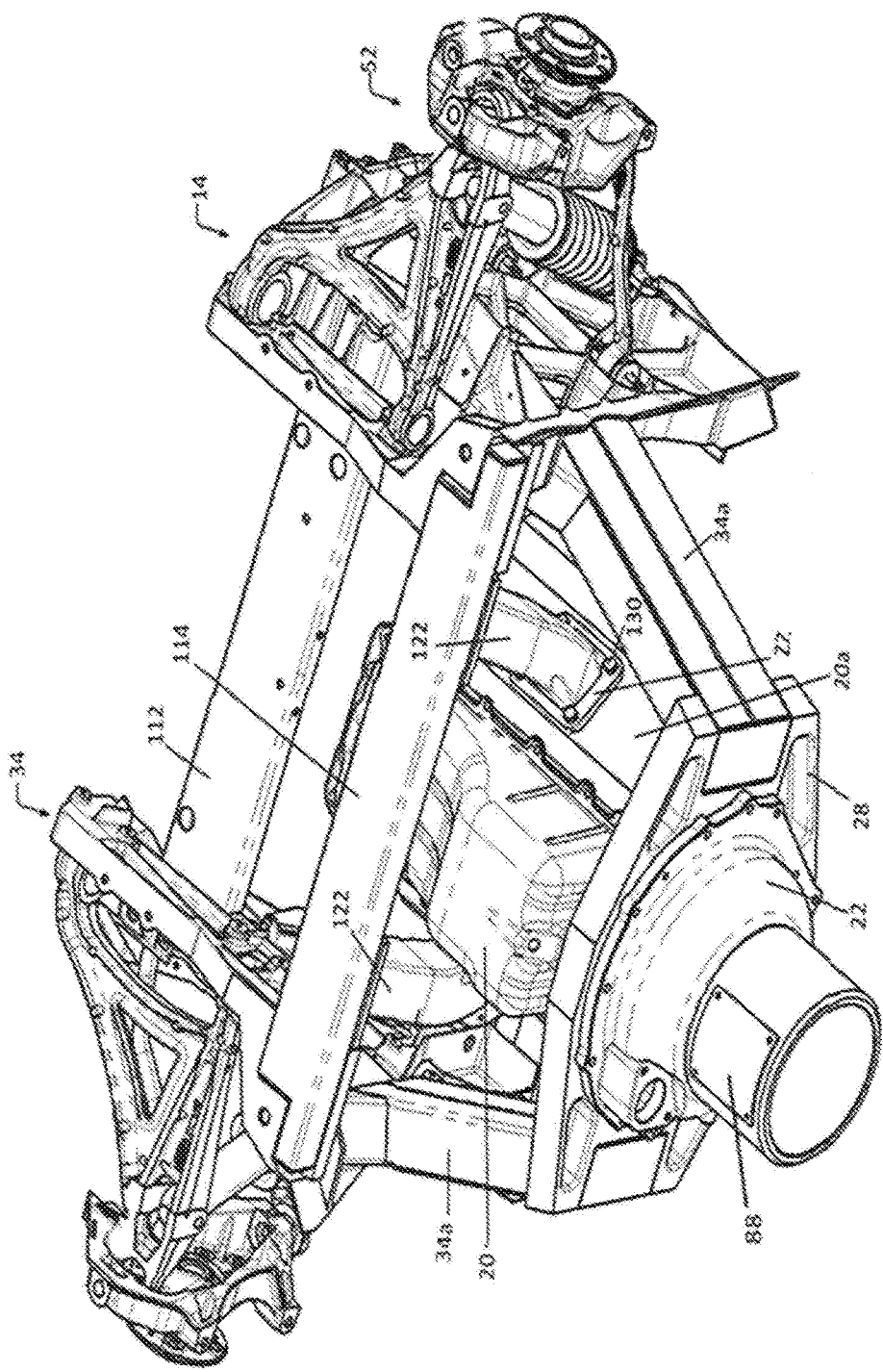
Figure 22:
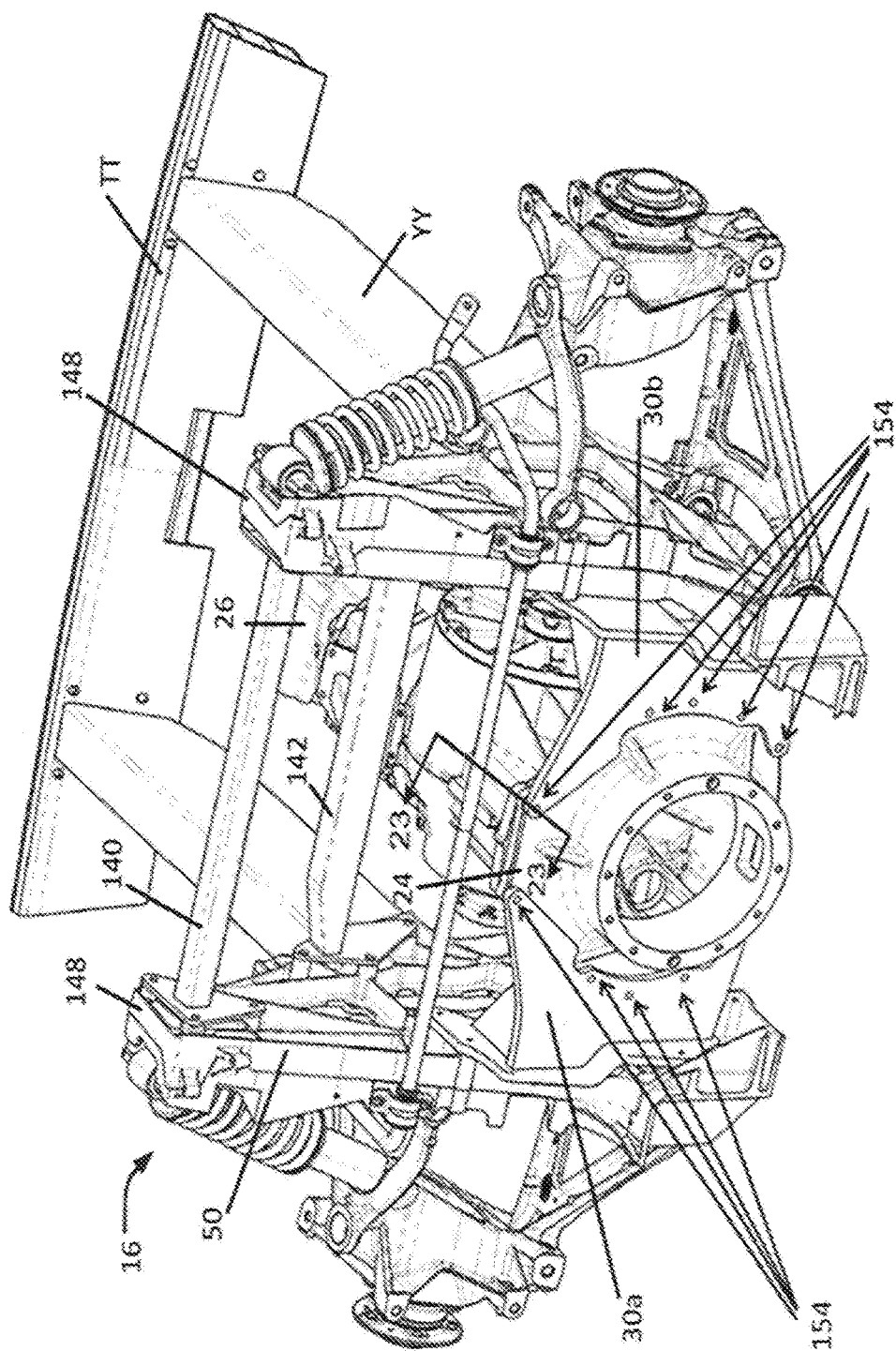
Figure 23:
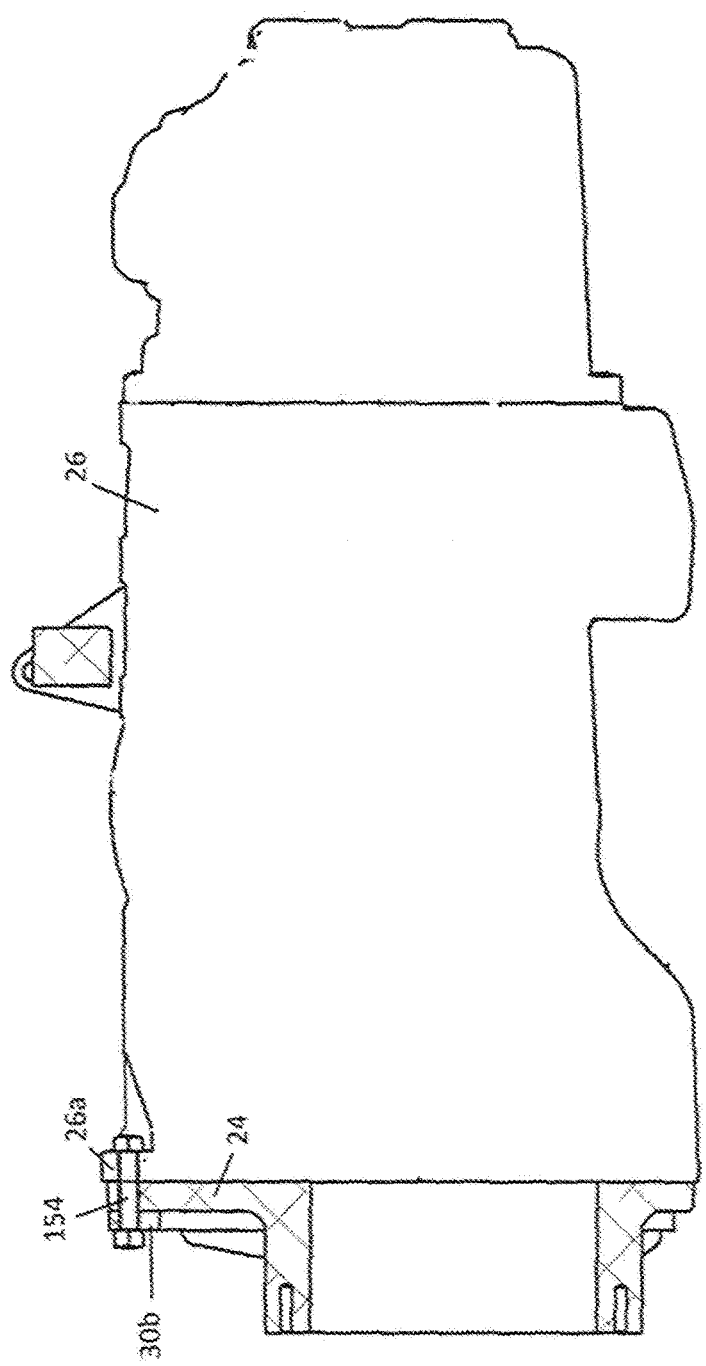
Figure 24:
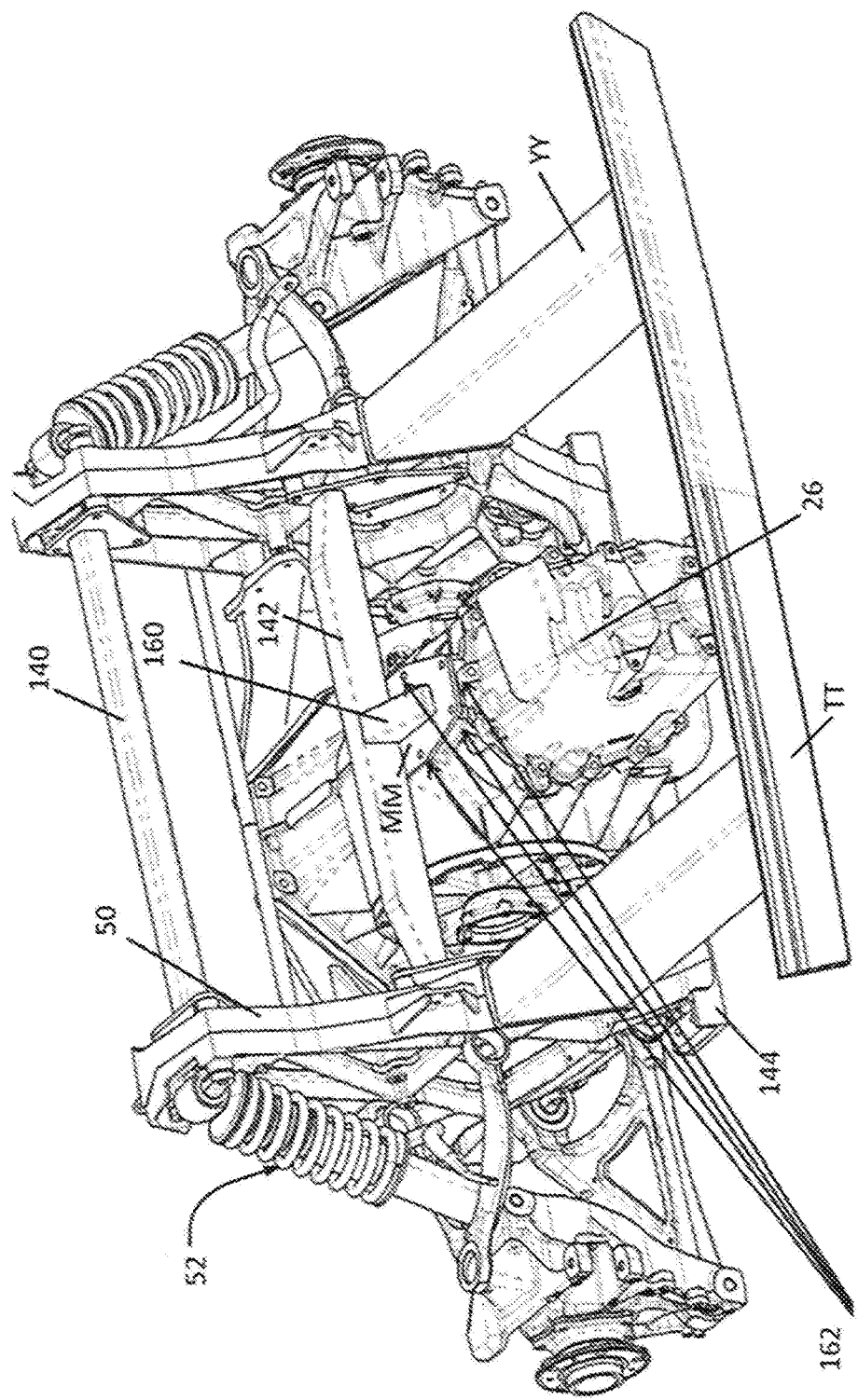
Figure 25:
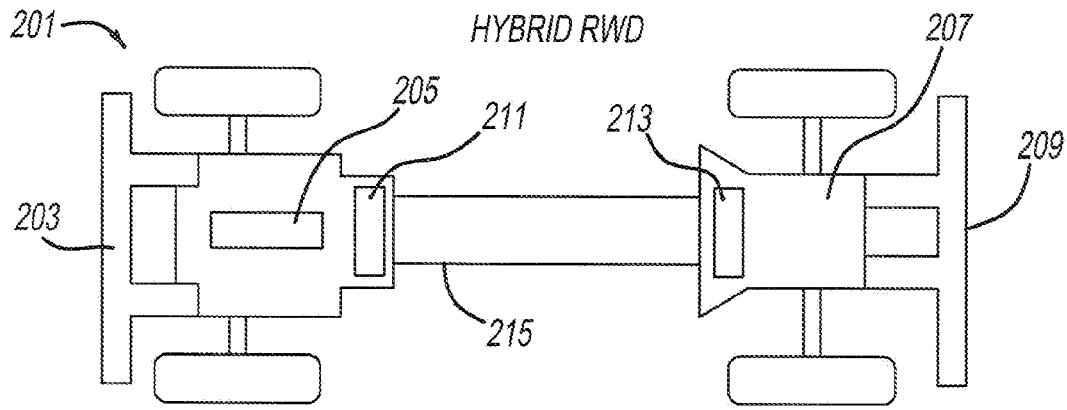
Figure 26:
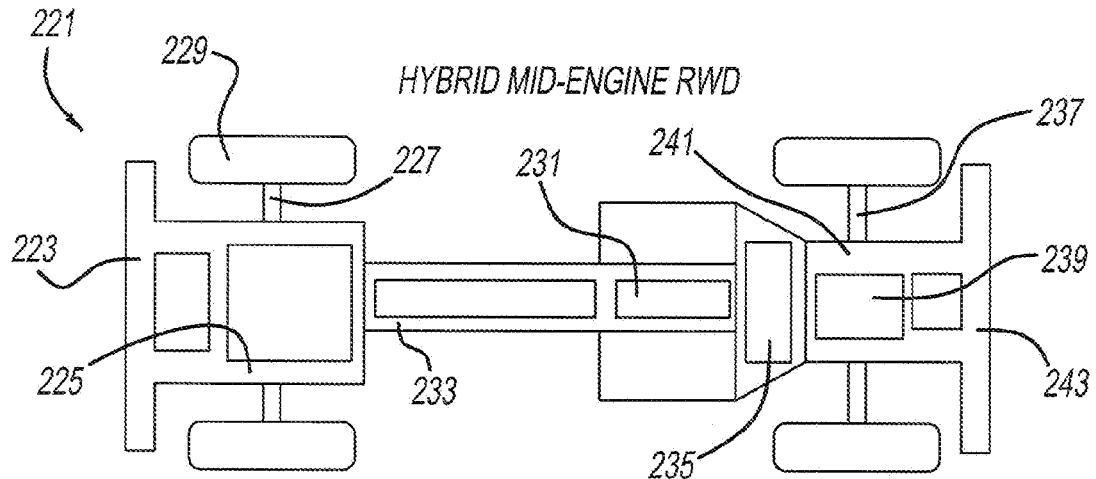
Figure 27:
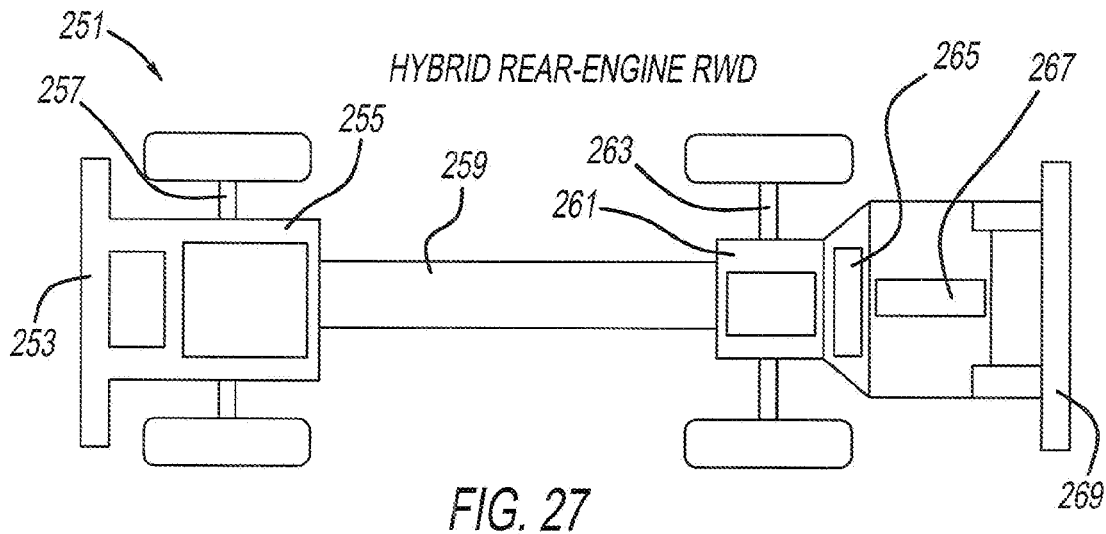
Figure 28:
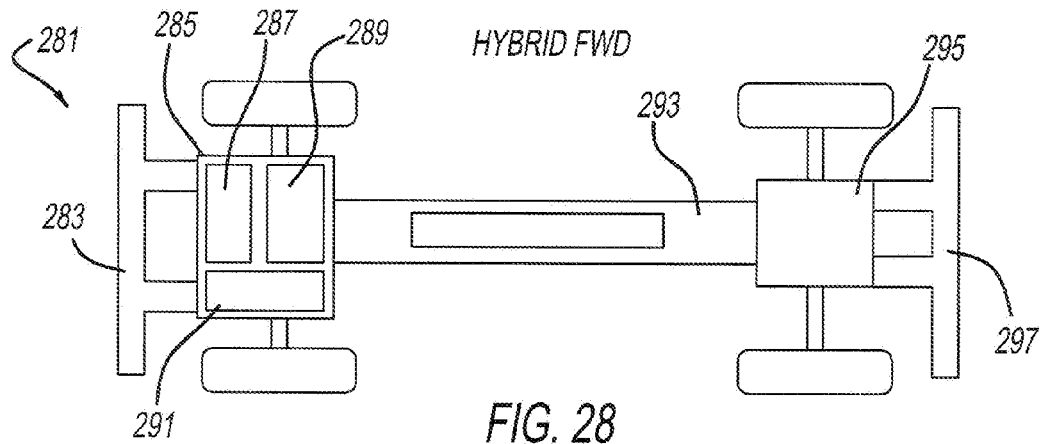
Figure 29:
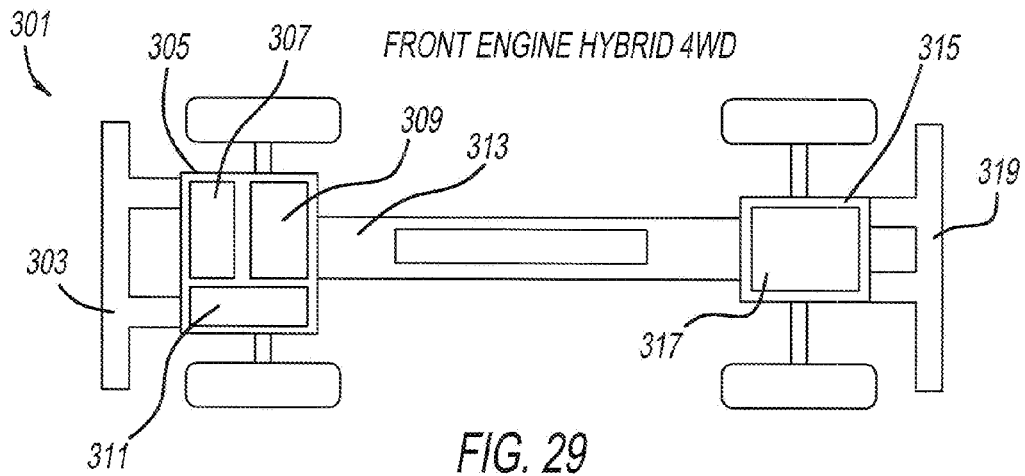
Figure 30:
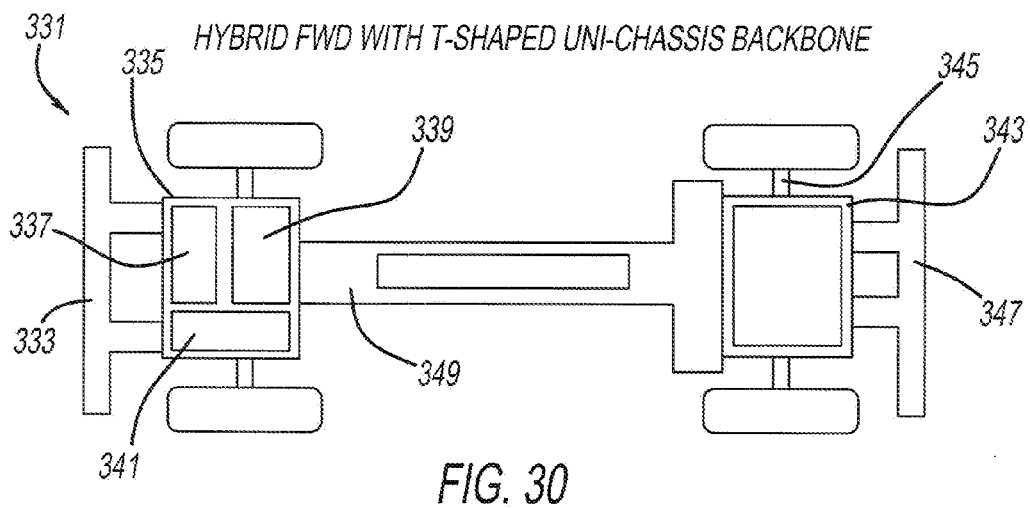
Figure 31:
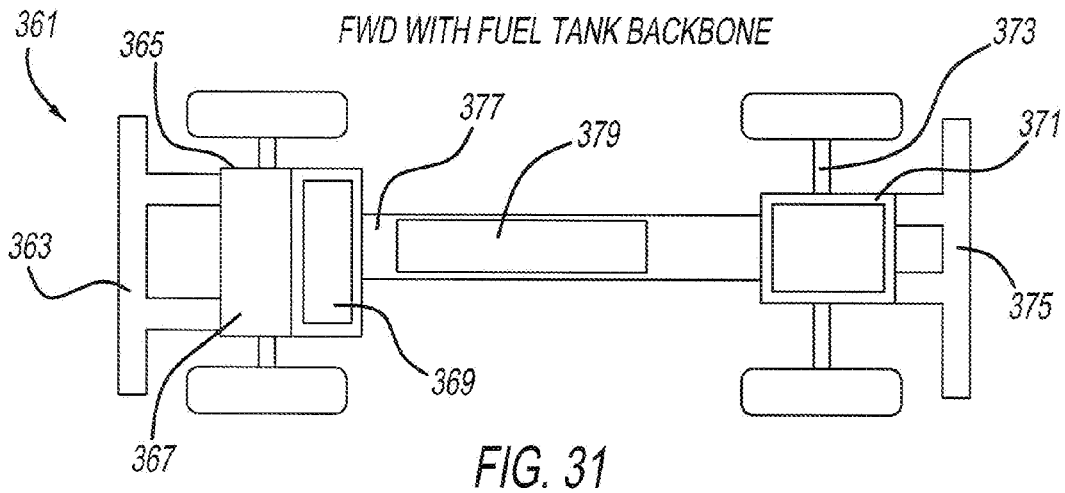
Figure 32:
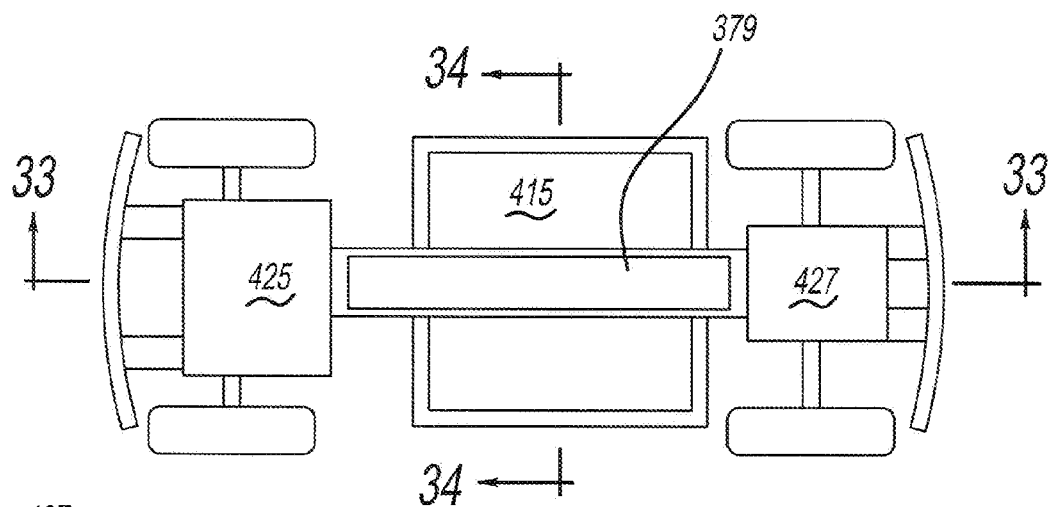
Figure 33:
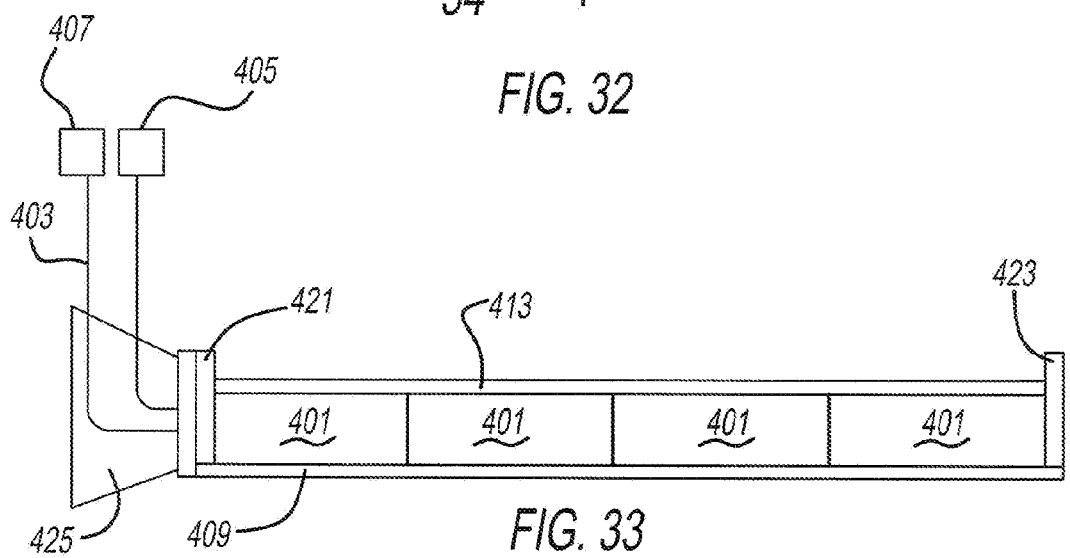

FIG. 11 is a top view of a universal chassis shown with body mounts according to additional features;

FIG. 12 represents the universal chassis according to the present teachings that accommodates various rear-wheel drive configurations;

FIG. 13 represents the universal chassis according to the present teachings that accommodates various front-wheel drive configurations;

FIG. 14 represents the universal chassis according to the present teachings that accommodates various four wheel drive configurations;

FIG. 15 represents the universal chassis according to the present teachings that accommodates an electrically powered four wheel drive configuration;

FIG. 16 represents the universal chassis according to the present teachings that accommodates a plug-in series hybrid type powertrain configuration;

FIG. 17 represents the universal chassis according to the present teachings that accommodates a dual-mode hybrid type configuration;

FIG. 18 represents a Finite Element model of the front engine, rear transaxle and backbone reacting torsional and bending suspension loads;

FIG. 19 is a front perspective view of the front structure of the universal chassis constructed in accordance to one example of the present disclosure;

FIG. 20 is a cross-sectional view taken along lines 20-20 of FIG. 19;

FIG. 21 is a bottom perspective view of the front structure of FIG. 19;

FIG. 22 is a front perspective view of the rear structure of the universal chassis constructed in accordance to one example of the present disclosure;

FIG. 23 is a cross-sectional view taken along lines 23-23 of FIG. 22;

FIG. 24 is a rear perspective view of the rear structure of FIG. 23;

FIG. 25 represents the universal chassis according to the present teachings that accommodates a hybrid rear-wheel drive configuration;

FIG. 26 represents the universal chassis according to the present teachings that accommodates a hybrid mid-engine, rear-wheel drive configuration;

FIG. 27 represents the universal chassis according to the present teachings that accommodates a hybrid rear-engine, rear-wheel drive configuration;

FIG. 28 represents the universal chassis according to the present teachings that accommodates a hybrid front-wheel drive configuration;

FIG. 29 represents the universal chassis according to the present teachings that accommodates a hybrid front-engine, four wheel drive configuration;

FIG. 30 represents the universal chassis according to the present teachings that accommodates a hybrid front-wheel drive configuration with a T-shaped universal chassis backbone;

FIG. 31 represents the universal chassis according to the present teachings that accommodates a front-wheel drive and transaxle configuration with a fuel tank in a universal chassis backbone;

FIG. 32 is a diagrammatic top view of the universal chassis including an internal energy storage compartment;

FIG. 33 is a diagrammatic sectional view, taken along line 33-33 of FIG. 32, showing the universal chassis including the internal energy storage compartment, here for use with a battery;

FIG. 34 is a cross-sectional view, taken along line 34-34 of FIG. 32, showing the universal chassis including the internal energy storage compartment, here for use with the battery;

FIG. 35 is an exploded cross-sectional view, similar to FIG. 34, showing the universal chassis including the internal energy storage compartment, here for use with the battery;

FIG. 36 is a diagrammatic top view of the universal chassis, similar to that of FIG. 30, including the T-shaped universal chassis backbone;

FIG. 37 is a diagrammatic side view of the universal chassis of FIG. 36;

FIG. 38 is a diagrammatic top view of the universal chassis, similar to that of FIG. 31, including the internal energy storage compartment, here for use with fluid fuel;

FIG. 39 is a cross-sectional view, taken along line 39-39 of FIG. 38, showing a first embodiment fluid fuel tank in the universal chassis; and FIG. 40 is a cross-sectional view, taken along line 39-39 of FIG. 38, showing a second embodiment fluid fuel tank in the universal chassis.

DETAILED DESCRIPTION

The following description is merely exemplary in nature and is not intended to limit the present disclosure, application, or uses.

While the present invention is summarized above as being applicable for several types of vehicles, it is exemplified herein as being installed in a conventional front engine vehicle with a rear transaxle.

Figure 1:
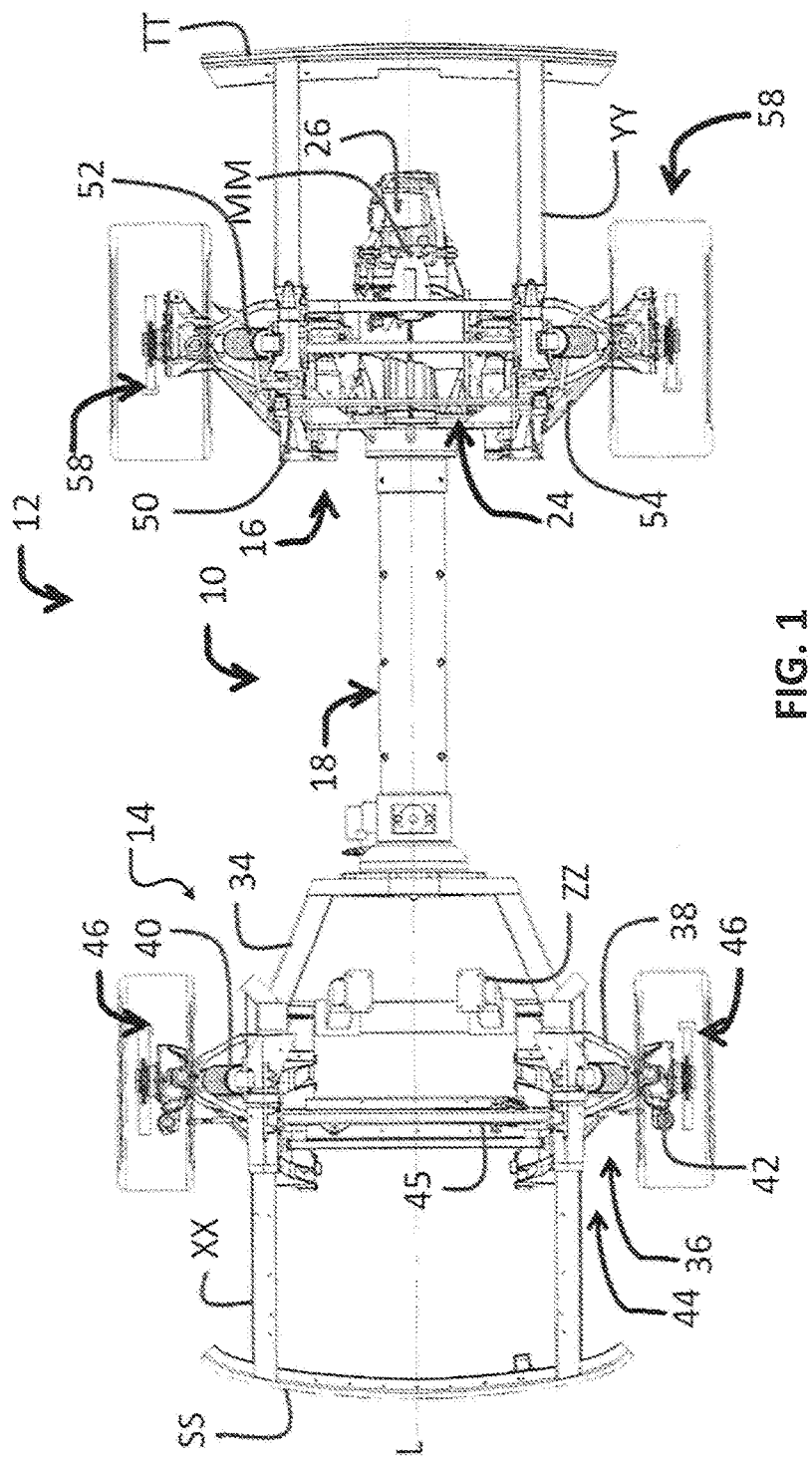
FIG. 1 is a schematic plan view of a universal chassis according to one example of the present teachings and shown on an exemplary vehicle.
Figure 2A:
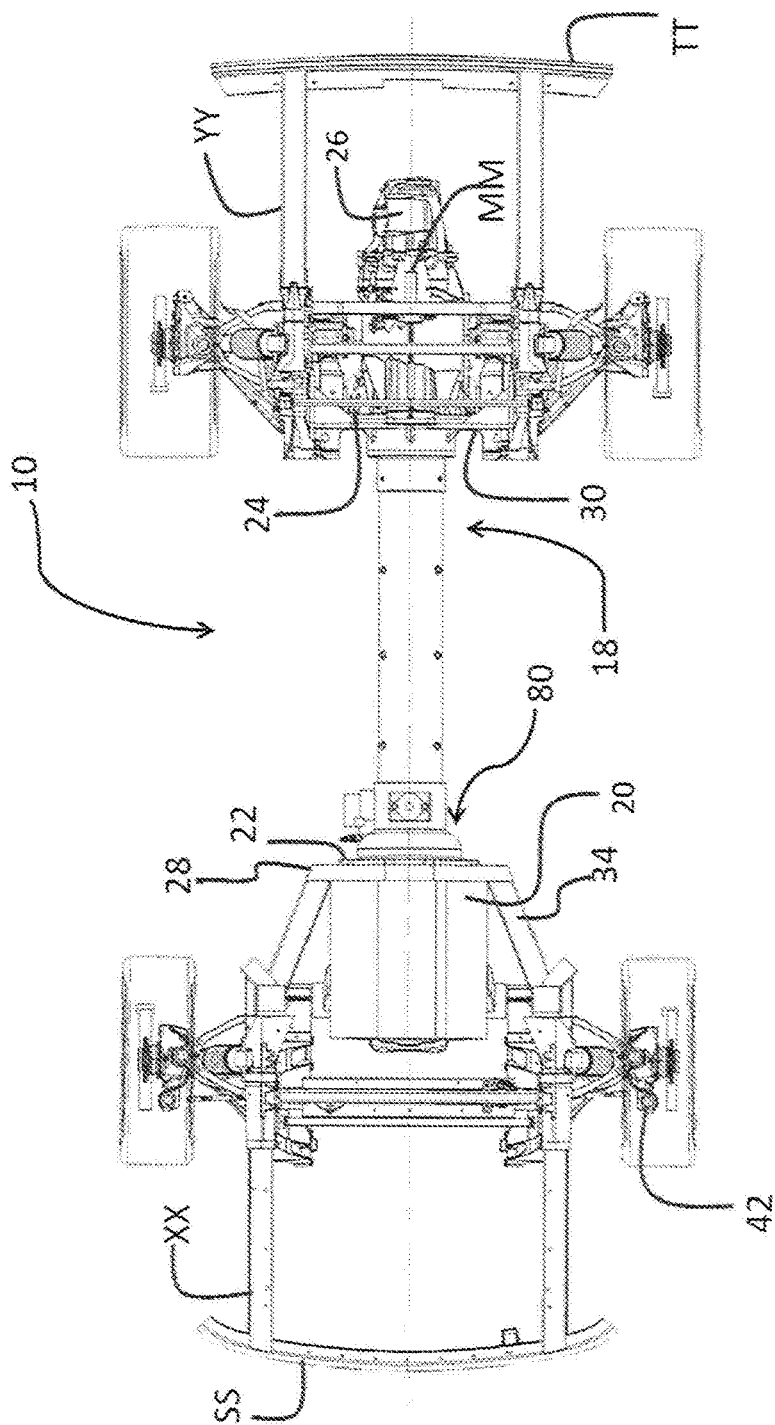
FIG. 2a is a detail top plan view of the universal chassis of FIG. 1.
Figure 2B:
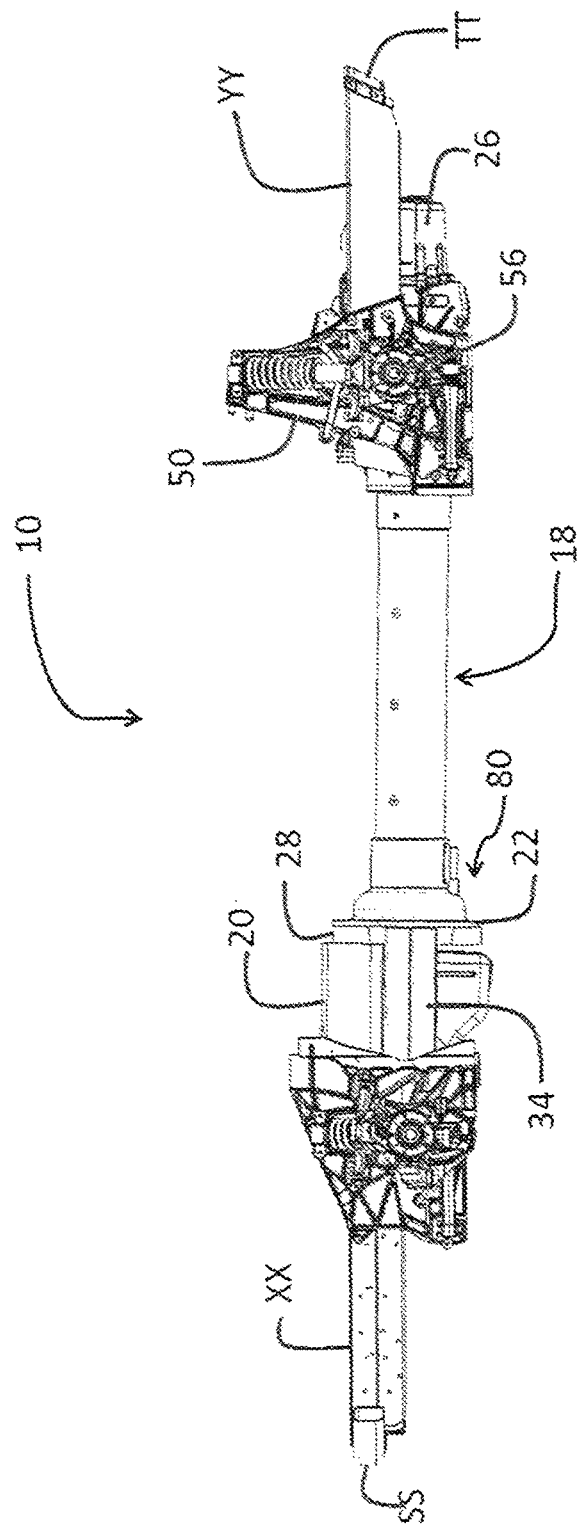
FIG. 2b is a detail side view of the universal chassis of FIG. 1.
Figure 2C:
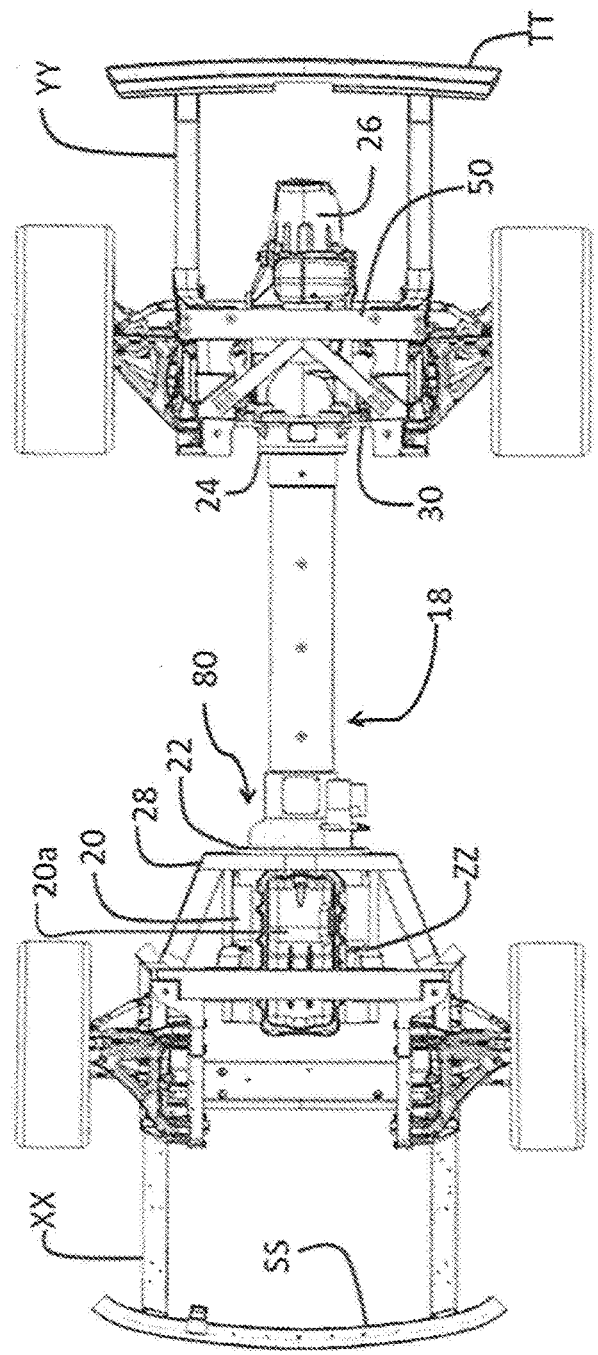
FIG. 2c is a detail bottom plan view of the universal chassis of FIG. 1.
Figure 3A:
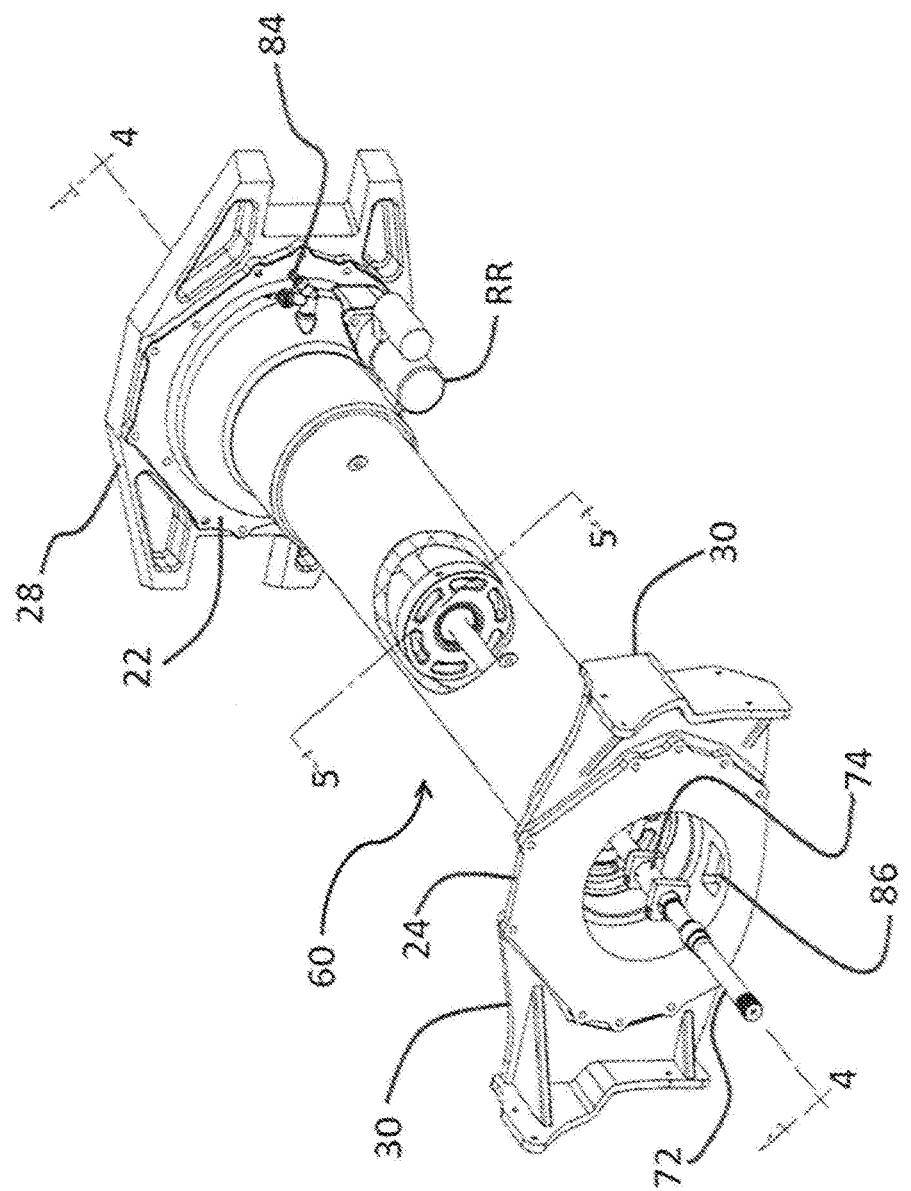
FIG. 3a is a perspective view of the universal chassis of FIG. 1 illustrating a backbone structure coupled to a front and rear structure according to one example.
Figure 3B:
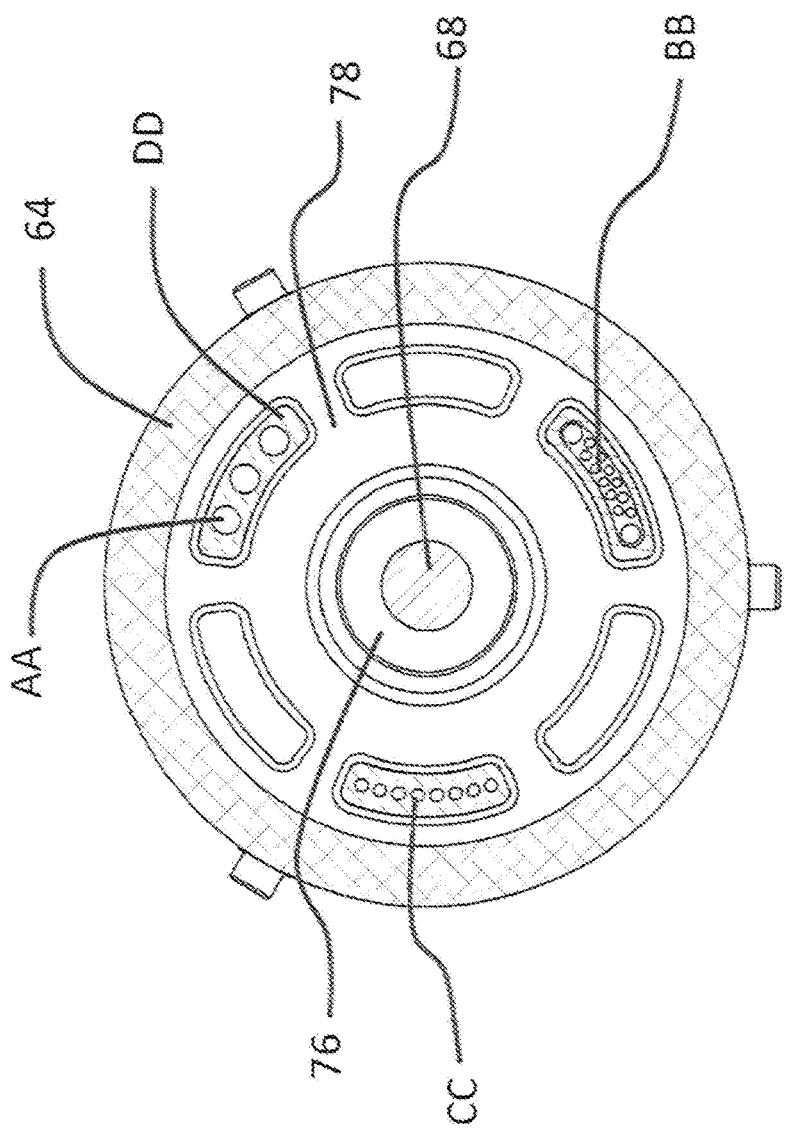
FIG. 3b is a cross-section of the bearing support taken along line 5-5 of FIG. 3a according to one example.
Figure 4:
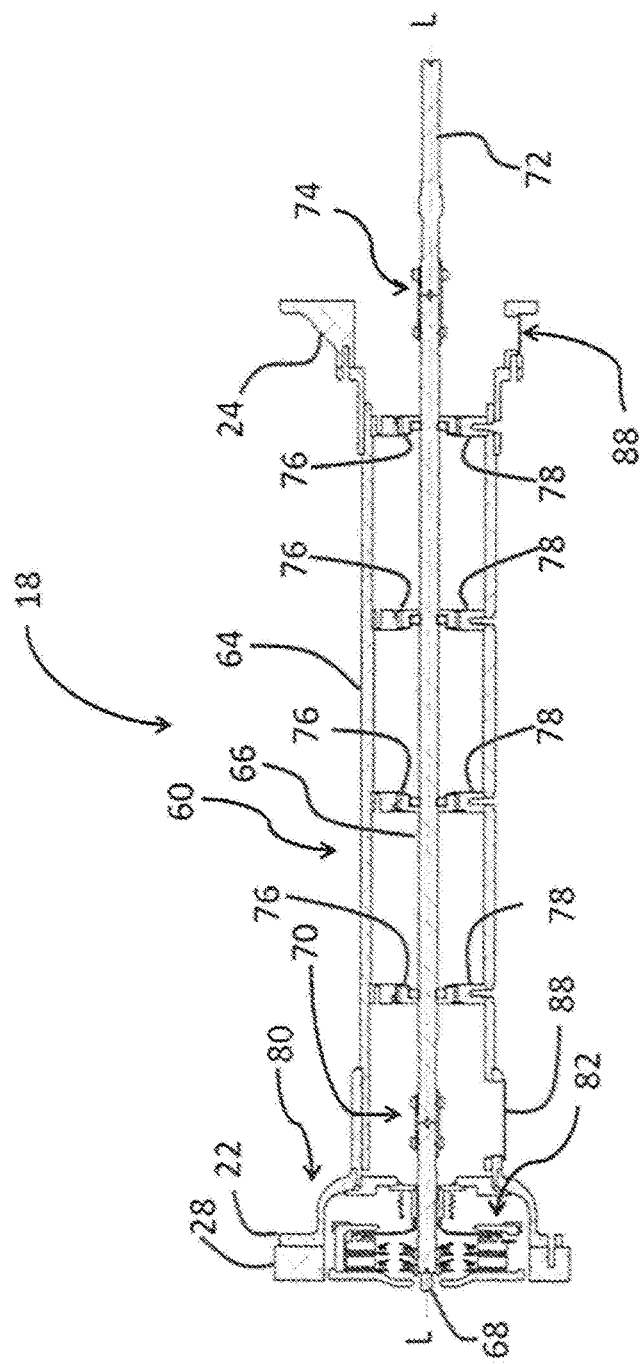
Figure 5:
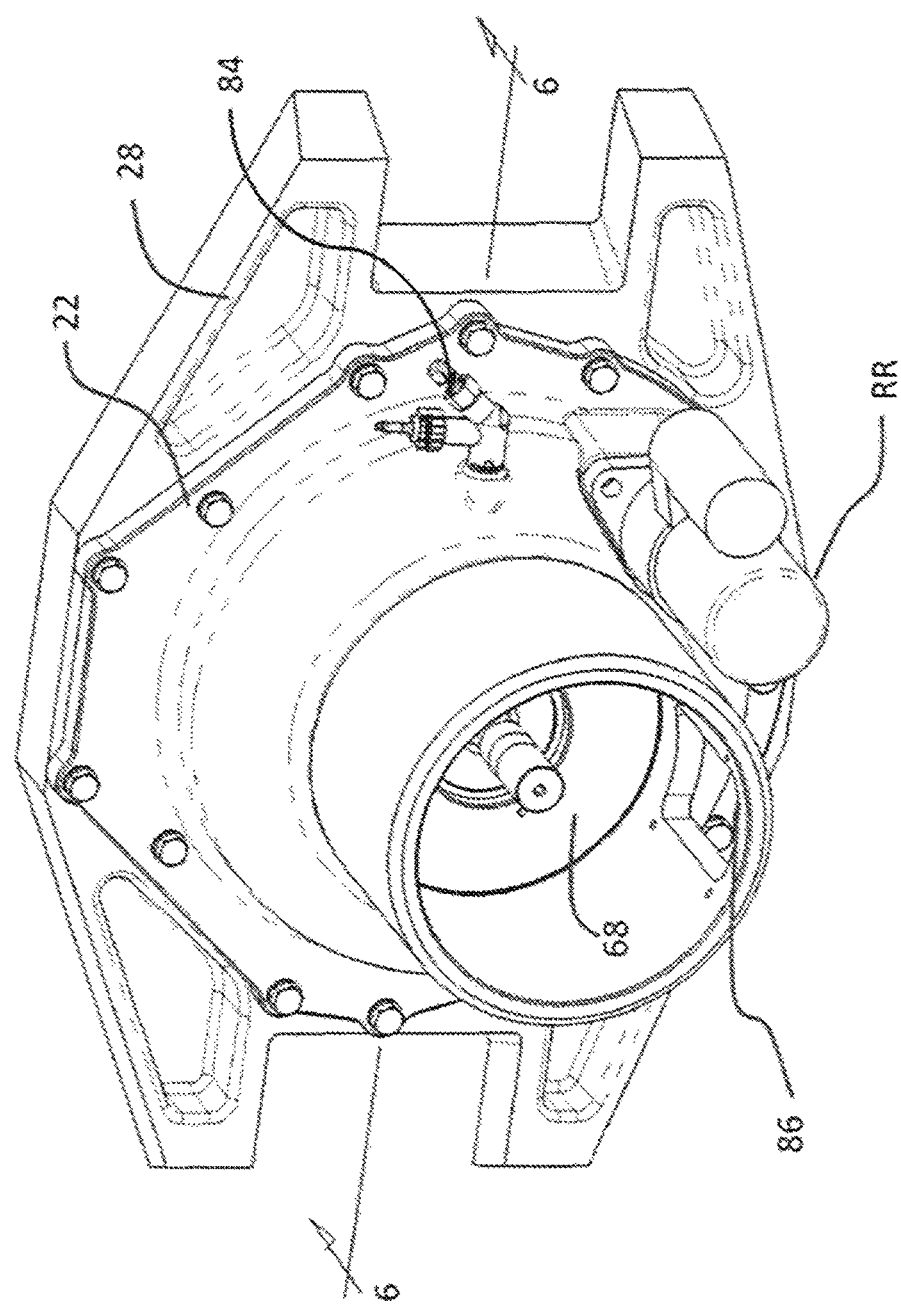
FIG. 5 is a front perspective view of a bell housing associated with the universal chassis of FIG. 3.
Figure 6:
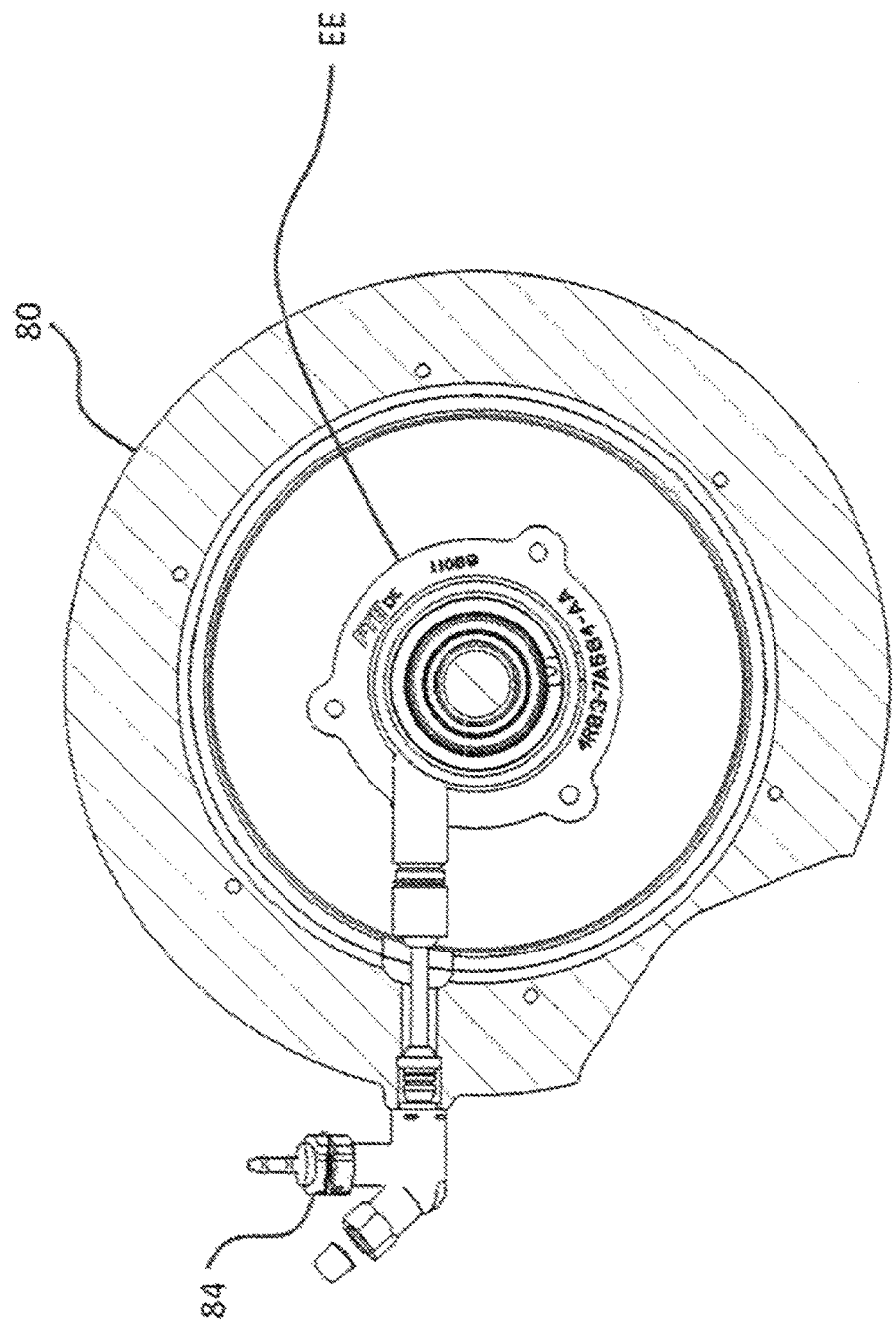
FIG. 6 is a cross-sectional view of the bell housing taken along line 6-6 at FIG. 5.

Referring initially to FIGS. 1-2c, a plan view of a unitary or uni-chassis constructed in accordance to the present teachings is shown and generally identified at reference numeral 10. The uni-chassis 10 is shown associated with an exemplary vehicle 12. The uni-chassis 10 includes five major assemblies: a front structure 14 which is coupled to a front energy absorbing crash structure XX, a rear structure 16 which is attached a rear energy absorbing crash structure YY, and a backbone structure 18. The front structure 14 is rigidly attached to an engine 20. Suspension loads are fed directly to the engine 20 through rigid engine mounts ZZ (located substantially near the front of the engine 20, see also FIG. 21), such that the torsional and bending loads are transferred directly through an engine block 20a of the engine 20 to a front mounting flange 22.

The backbone structure 18 is rigidly attached to the front structure 14 through the front mounting flange 22 and rigidly attached to the rear structure 16 through a rear mounting flange 24. The rear structure 16 is rigidly mounted to a transaxle 26. Suspension loads are fed directly into the transaxle 26 through a rigid mount MM (located substantially near the rear of the transaxle 26, see also FIG. 24), such that the torsional and bending loads are transferred through a transaxle case 26a of the transaxle (FIG. 24) to the rear mounting flange 24. As shown in FIG. 2a, a front and rear mounting plate 28 and 30 may be incorporated to couple the front and rear mounting flanges 22 and 24 to the front and rear structures 14 and 16, respectively. As shown in the finite element model FIG. 18, the engine block 20a and transaxle case 26a are of sufficient rigidity such that no other structural members are required to provide adequate chassis stiffness. Explained further, suspension loads are successfully received and accommodated by the engine block 20a at engine mounts ZZ and the transaxle case 26a at mounts MM.

The front structure 14 includes the engine 20 rigidly attached to a front sub-frame 34. In one example, the front structure 14 can be integrally defined with the front mounting plate 28. Attached to the engine 20 and front sub-frame 34 are all the front chassis systems typically mounted to a chassis, including, but not limited to: a suspension system 36 with control arms 38, springs and dampers 40, knuckle and spindle 42; steering system 44 including rack and pinion 45 and tie rods; tire/wheel/brake assemblies 46 attached to the suspension spindle and knuckle; accessory drives including power steering pump, water pump, alternator, etc. (not specifically shown), attached to the engine 20 and front sub-frame 34. Attached to the front structure 14 are the energy management boxes XX having laterally offset frame members that are rigidly fixed (such as by fasteners and/or welding) to the front structure 14 on one end and rigidly fixed to the bumper beam 55 on an opposite end. The energy management boxes XX are configured to (FIG. 2a) deform and absorb front crash loads from a bumper beam SS; transfer them through the front structure 14; to be reacted by the backbone structure 18. The energy management boxes XX are designed to absorb nominally 35 mph front impact loads. The energy boxes XX are bolted to the front structure 14, such that frontal impact loads are transferred through the front structure 14 to the backbone structure 18. The front structure 14 and backbone structure 18 have nominally twice the stiffness of the energy management boxes XX, so that in the majority of crash scenarios the front structure 14 and engine 20 remain undamaged. Optionally, the vehicle cooling system can be attached to the energy management boxes XX, and the bumper beam SS can be either bolted or welded to the energy management boxes XX, depending upon serviceability requirements.

The rear structure 16 of the preferred embodiment, as shown in FIG. 1, consists of the transaxle 26 with a rear sub-frame 50 rigidly attached to it, and optionally, to the rear mounting flange 24 of the backbone structure 18. Attached to the transaxle 26 and rear sub-frame 50 are all the rear chassis systems typically mounted to a chassis, including, but not limited to: a rear suspension system 52 including control arms 54, springs and dampers, knuckle and spindle (not specifically shown); drive shafts 56; and tire/wheel/brake assemblies 58 attached to the knuckle. Coupled to the rear structure 16 are the energy management boxes YY (see also FIG. 22) having laterally offset frame members that are rigidly fixed (such as by fasteners and/or welding) to the rear structure 16 on one end and rigidly fixed to a rear bumper beam TT on an opposite end. The energy management boxes YY are configured to deform and absorb rear crash loads from the rear bumper beam TT; transfer them through the rear structure 16; to be reacted by the backbone structure 18. The energy management boxes YY are designed to absorb nominally 35 mph rear impact loads. The energy boxes YY are bolted to the rear structure 16, such that rear impact loads are transferred through the rear structure 16 to the backbone structure 18. The rear structure 16 and backbone structure 18 have nominally twice the stiffness of the energy management boxes YY, so that in the majority of crash scenarios the rear structure 16 and transaxle 26 remain undamaged. Optionally, the fuel tank (not specifically shown) can be attached to the rear structure 16.

With additional reference now to FIGS. 3a-9, the backbone structure 18 includes a main section 60 having the front mounting flange 22 and the rear mounting flange 24. As described, the front and rear mounting flanges 22 and 24 can be coupled to the front structure 14 and rear structure 16, respectively (FIG. 1) by way of conventional fasteners. Alternatively, the backbone structure 18 can be partially or entirely coupled to the front and/or rear structures 14 and 16 by other methods, such as, but not limited to, welding. In addition, the backbone structure 18 can be integrally formed with the front and/or rear structures 14 and 16.

The main section 60 defines a tube 64 having a quill shaft 66 (FIG. 4) rotatably disposed therewithin. The quill shaft 66 can be co-axial to a longitudinal centerline L of the tube 64. The quill shaft 66 is attached at a front end to an engine output shaft 68 through a first coupler 70. The quill shaft 66 is attached at a rear end to a transaxle input shaft 72 through a second coupler 74. The quill shaft 66 is supported by isolated bearings 76 mounted inside and attached to the backbone structure 18, in order to control run-out of the quill shaft 66. The isolated bearings 76 are supported by bearing supports 78. As depicted in the cross-section (FIG. 3b), the bearing supports 78 incorporate dedicated slots that provide a secure passage for routing of fuel lines AA, electrical lines BB and brake lines CC from the front to the rear of the vehicle. These lines are isolated from the bearing support by grommets DD. This unique positioning of these lines in the slots protects them from external environmental elements (salt, water, corrosion, etc.) and prevents damage in the event of a vehicle crash. In one example, the front mounting flange 22 may be integrally formed with a bell housing 80. The bell housing 80 can house a flywheel/clutch assembly 82, starter motor RR, and also define a bleeder assembly 84 for a hydraulic clutch actuator EE.

The primary function of the backbone structure 18 is to rigidly connect the front and rear structures 14 and 16 to form the uni-chassis 10. The backbone structure 18 is a one-piece closed section tubular structure, and as shown in the preferred embodiment, has the tube 64 that defines a circular cross-section. The tube 64 may be changed in size and form to optimize backbone properties. The size, shape and material of the backbone structure 18 must be selected so that acting in unison with the front and rear structures 14 and 16, the uni-chassis 10 provides sufficient torsional and bending rigidity and strength. Because the uni-chassis 10 does not incorporate a conventional frame, the backbone structure 18 forms the connection between the front and rear structures 14 and 16. The chassis loads are therefore transmitted solely by the backbone structure 18 between the front and rear structures 14 and 16.

In a typical automotive application, the backbone structure 18 should provide approximately 10,000 ft-lb/deg. (minimally 4000) torsional stiffness and 25,000 lb/in (minimally 10,000) bending stiffness; and must have sufficient strength, such that it can withstand at least 2 g vehicle loads in bending and torsion (transmitted through the suspensions 38 and 52 of the front and rear structures 14 and 16, respectively), without permanent yield. In one example, the tube 64 can define an outer diameter of between 6 and 10 inches, and preferably 8 inches. The tube 64 can be formed of a rigid lightweight material such as, but not limited to, aluminum. The tube 64 can have a wall thickness of substantially about 0.5 inch. As shown in FIG. 18, finite element modeling confirmed that an 8 inch diameter, 0.5 inch wall aluminum backbone will provide 13,000 ft-lbs/degree torsion and 47,000 lbs./inch bending stiffness—far exceeding the above mentioned requirements.

The secondary function of the backbone structure 18 as shown in the preferred embodiment is to act as a torque tube to provide support for the transfer of torque from the engine 20 in the front structure 14 to the transaxle 26 in rear structure 16 through the quill shaft 66.

The backbone structure 18 may be flared out at the front (e.g. the bell housing 80) through the front mounting flange 22 to get around the flywheel/clutch assembly 82 to attach to the engine 20. This bell housing 80 may be a separate part, but maintains backbone stiffness by being rigidly attached to the backbone structure 18. Similarly, the rear of the backbone structure 18 can be flared to attach to the rear structure 16 through the rear mounting flange 24. The backbone structure 18 may also incorporate additional holes, such as holes 86 (FIGS. 3, 5 and 19) and cover plates, such as cover plates 88 (FIG. 4) to provide access to the quill shaft 66 and/or the first and second couplers 70 and 74.

With reference to FIGS. 10 and 11, various exemplary body mounts 90 are shown. A vehicle body 92 includes a lateral beam or cross-member 94 coupled to the backbone structure 18. As can be appreciated, the vehicle body 92 can comprise various body components, such as seats 96. The cross-member 94 can be suitably attached to the backbone structure 18 at or near a torsional node defined in the tube 64. The uni-chassis 10 of the present invention allows various loads associated with the vehicle body 92 to be substantially de-coupled from various loads associated with the uni-chassis 10. A body tunnel 98 can be defined by the body 92. The body tunnel 98 can accommodate the tube 64, and is designed to interfere with the backbone tube, so that side impact crash forces on the body can be reacted by the backbone.

While the preferred embodiment depicts a uni-chassis 10 utilizing the engine 20 as part of the front structure 14 and transaxle 26 as part of the rear structure 16, connected by a backbone structure 18, the uni-chassis concept can be applied to other powertrain arrangements. For example, a typical rear-wheel drive (RWD) vehicle (such as the one shown in FIG. 1) with front engine 20 and transmission and rear axle and drive shaft 56 can utilize the engine 20 and transmission as the core of the front structure 14 for attaching the front chassis systems, and the rear axle as the core of the rear structure 16 for attaching the rear chassis systems, connected by a backbone structure 18 incorporating a quill shaft 66 similar to that depicted in the preferred embodiment.

The application of the uni-chassis concept to this, and other powertrain arrangements, including front-wheel (FWD) and four-wheel (4WD) drive; are tabulated below:

TABLE 1

Alternative uni-chassis Powertrain Arrangements

| | | Front Structure | Backbone | Rear Structure |
|---|---|---|---|---|
| A. | RWD | Engine | Engine to Transaxle | Transaxle |
| | | Engine & Transmission | Transmission to Axle | Axle |
| | | Front Chassis Structure | Front Structure to Engine | Engine & Transaxle |
| | | Front Chassis Structure | Front Structure to Transaxle | Transaxle & Engine |
| B. | FWD | Engine & Transaxle | Transaxle to Rear Structure | Rear Chassis Structure |
| | | Transaxle & Engine | Engine to Rear Structure | Rear Chassis Structure |
| C. | 4WD | Engine, Front Axle | Engine to Transaxle | Transaxle |
| | | Engine, Transmission, Front Axle | Transmission to Axle | Rear Axle |
| | | Front Axle | Front Axle to Engine | Engine & Transaxle |
| | | Front Axle | Front Axle to Transaxle | Transaxle & Engine |

The uni-chassis concept is not limited in application to conventional powertrain technology. For example, an electric powertrain application (FIG. 15) might use a front and/or rear motor for the front and rear structures, and the backbone structure to house the batteries, to create a two or four wheel drive (4WD) electric vehicle. A hybrid powertrain (FIG. 16) might use a front internal combustion engine and motor generator on a first end and an electric motor on an opposite end. Again, a backbone structure can house the batteries and connect front and rear structures. A dual mode hybrid powertrain (FIG. 17) might incorporate a differential at one end and a dual mode electronic transmission incorporated in the backbone structure. Many other arrangements of new powertrain technologies can be applied to the uni-chassis concept, by using one or more of the powertrain elements e.g., engine, transmission or axle, to create the core of the front or rear structures and connect them with a backbone.

An exemplary method of constructing a vehicle according to the present teachings will now be described. The present invention provides flexibility in creating a unique chassis for any given conventional vehicle (internal combustion engine, transaxle, suspension etc.) electric vehicle or hybrid vehicle while still maintaining the same uni-chassis architecture. In this way, a vehicle manufacturer (or assembler) can select a desired vehicle configuration and powertrain. A front and rear structure with front and rear energy management structure can then be assembled to accommodate the selected vehicle configuration and vehicle powertrain. A central backbone structure can be assembled between the front and rear structures to create a rolling chassis. During attachment of the central backbone between the front and rear structures, the operational components (e.g., quill shaft for conventional vehicle, battery for electric or hybrid vehicle), are suitably coupled or connected. The closed tube of the central backbone can be made to any desired length suitable for the desired application. The desired vehicle body can then be coupled to the rolling chassis.

With particular reference now to FIGS. 19-21, additional features of the front structure 14 will be described in greater detail. The front structure 14 can generally include the front sub-frame 34. The front sub-frame 34 can include an upper cross member 110, a middle cross member 112, and a lower cross member 114 all rigidly connected between front lateral frame members 120. The upper cross member 110, the middle cross member 112, and the lower cross member 114 can all be rigidly affixed to the front lateral frame members 120 such as by way of rigid fasteners and/or welding. It will be appreciated that the front lateral frame members 120 may consist of a collection of rigidly connected frame components. Engine brackets 122 (FIG. 21) are rigidly affixed between the lower cross member 114 and the engine block 20a. Specifically, first ends of the engine brackets 122 can be welded to the lower cross member 114 while second ends of the engine brackets 122 are rigidly connected to the engine block 20a at the engine mounts ZZ. In the particular example shown in FIG. 21, the engine mount ZZ includes a flange that is bolted by way of bolts 130 into the engine block 20a. In addition, bolts 132 (FIG. 19) rigidly connect the front mounting flange 22, the front mounting plate 28 and the engine block 20a of the engine 20 (see FIG. 20). Bolts 132 can be arranged around the front mounting flange 22 for directly threadably mating into the engine block 20a. The bolts 132 can extend through complementary bores defined in the front mounting flange 22 and the front mounting plate 28. A pair of dowels 134 can additionally be located through the front mounting flange 22, the front mounting plate 28, and the engine block 20a of the engine 20. The front sub frame 34 can further comprise a pair of angled frame members 34a that are generally rigidly affixed between the front lateral frame members 120 and the front mounting plate 28.

The front mounting plate 28 comprises two pairs of outwardly extending arms 28a and 28b that nestingly and fixedly receive the angled frame members 34a. The angled frame member 34a can be welded to the arms 28a and 28b. The configuration facilitates accommodation of torsioned forces in the front structure 14.

With reference now to FIGS. 22-24, additional features of the rear structure 16 will be further described. The rear sub-frame 50 of the rear structure 16 can generally include an upper cross member 140, a middle cross member 142, and a lower cross member 144 all rigidly connected between a pair of rear lateral frame members 148. The upper cross member 140, the middle cross member 142, and the lower cross member 144 are all rigidly attached to the respective rear lateral frame members 148 by way of fasteners such as bolts and/or welding. The rear lateral frame members 148 can comprise a collection of rigidly attached frame components. The rear mounting plate 30 can collectively comprise a first rear mounting plate 30a and a second rear mounting plate 30b. The first and second rear mounting plates 30a and 30b are rigidly connected between the rear lateral frame members 148 and the rear mounting flange 24 by way of bolts 154. As illustrated in FIG. 23, the bolt 154 can extend through the rear mounting plate 30b, the rear mounting flange 24, and a transaxle mounting flange 26a of the transaxle 26. It will be appreciated that the mounting arrangement of the first rear mounting plate 30a may be rigidly attached in a similar manner. A transaxle mounting bracket 160 rigidly connects the rigid mount MM with the middle cross member 142. In the example provided, the transaxle mounting bracket 160 is rigidly affixed to the transaxle 26 by way of bolts 162 extending through the rigid mount MM and into the transaxle 26.

Various hybrid vehicular configurations are employed with a universal chassis backbone or spine structure, as illustrated in FIGS. 25-30. For example, FIG. 25 illustrates a hybrid rear-wheel drive vehicle 201 employing a front energy absorbing crash structure 203 coupled to a front internal combustion engine 205 or sub-frame. A rear structure or sub-frame 207 includes a transaxle. A rear energy absorbing crash structure 209 is also mounted to the rear structure 207. Furthermore, an electric traction motor 211 is mounted adjacent to a rear portion of internal combustion engine 205 and/or another electric traction motor 213 is mounted adjacent a front end of the transaxle and rear structure 207. A tubular and closed section universal chassis backbone 215 rigidly couples the front and rear structures.

FIG. 26 shows a hybrid and mid-engine, rear-wheel drive configuration of an automotive vehicle 221. A front energy absorbing crash structure 223 is mounted directly to a front sub-frame 225 to which is secured a suspension 227 for controlling each front wheel 229. A mid-vehicular internal combustion engine 231 is mounted directly between a universal chassis backbone 233 and an electric traction motor 235, which are in turn, located completely between the front and rear wheel axles 237 and rotational axes. A transaxle 239 is located in a rear structure 241, mounted between a rear crash structure 243 and electric motor 235.

A hybrid rear engine and rear-wheel drive configured vehicle 251 can be observed in FIG. 27. In this configuration, a front energy absorbing crash structure 253 is directly mounted to a front sub-frame 255 to which, front wheel suspensions 257 are coupled. A universal chassis backbone 259 longitudinally extends directly from the front sub-frame 255 to a transaxle housing or structure 261 which also serves to mount rear wheel suspensions 263. An electric traction motor 265 is directly mounted to housing 261 for the transaxle and internal combustion engine 267, which is directly mounted to the electric motor housing 265. Moreover, a rear energy absorbing crash structure 269 is directly affixed to a rear frame adjacent to or, alternately, directly to the internal combustion engine.

FIG. 28 illustrates an automotive vehicle 281 having a hybrid front-wheel drive arrangement. A first energy absorbing crash structure 283 is directly mounted to a front sub-frame or structure 285 which supports an internal combustion engine 287, a front transaxle 289 and one or more traction electric motors 291. A universal chassis backbone structure 293 longitudinally extends directly between front sub-frame 285 and a rear sub-frame or structure 295 to which a rear energy absorbing crash structure 297 is directly mounted.

In another exemplary arrangement, FIG. 29 shows a front engine hybrid and four-wheel drive vehicle 301. This vehicle includes a front energy absorbing crash structure 303 directly mounted to a front sub-frame or structure 305 which supports an internal combustion engine 307, a front transaxle 309 and one or more electric traction motors 311. A universal chassis backbone 313 longitudinally extends directly from front sub-frame 305 to a rear sub-frame or structure 315 which supports one or more rear electric traction motors 317. A rear energy absorbing crash structure 319 is directly mounted to rear sub-frame 315.

As can be viewed in FIG. 30, an automotive vehicle 331 includes a front energy absorbing crash structure 333 directly mounted to a front sub-frame or structure 335 which supports an internal combustion engine 337, a front transaxle 339 and one or more front electric traction motors 341. A rear sub-frame or structure 343 is also provided to which rear suspensions 345 and a rear energy absorbing crash structure 347 are mounted. A generally T-shaped universal chassis backbone structure 349 longitudinally extends between and is directly mounted to the front and rear sub-frames 335 and 343, respectively. This shape of backbone structure will be described in greater detail hereinafter. The term "engine" as used throughout, should be understood to include an internal combustion engine, electric traction motor engine, a hybrid combination thereof or any other automotive power system for moving the vehicle.

FIG. 31 depicts a front-wheel drive vehicle 361 employing a front energy absorbing crash structure 363 directly mounted to a front sub-frame or structure 365 which houses or supports a front transaxle 367 and an internal combustion engine 369. A rear sub-frame or structure 371 serves as a mount for rear wheel suspensions 373 and a rear energy absorbing crash structure 375. A hollow and enclosed section of universal chassis backbone structure 377 longitudinally extends between and is directly mounted to front and rear sub-frames 365 and 371, respectively. Backbone structure 377 includes an internal energy storage compartment 379, such as a fuel tank or electric battery compartment with one or more electricity storage batteries 401 longitudinally arranged therein. Energy storage compartment 379 is longitudinally elongated relative to a narrower height and width, which are less than one-quarter of the longitudinal length thereof. The batteries contain connector terminals from which electric wires 403 extend; one of the wires is connected to electric traction or driving motor 405 while another of the wires is connected to a vehicular electronic control unit 407. One or more additional wires (not shown) may couple the batteries to a generator, external charger or the like. Each battery 401 is mounted to a removeable lower plate 409 which is screwed or otherwise mechanically fastened to laterally extending flanges 411 of the central universal chassis backbone structure 413.

FIG. 32 depicts a vehicular floor pan 415 of the body that is mounted to the universal chassis structure 413 through body mounts to support the vehicular body. FIG. 34 depicts how lower plate 409 completes a closed wall box cross-section, with the hollow internal energy storage compartment 379 therein, when attached to universal chassis backbone, such as by screws, hooks, latches or the like. This arrangement allows for easy serviceability and removal for access and replacement of batteries 401 (see FIGS. 33 and 35). This configuration is also highly advantageous by placing the heavy batteries along the vehicular centerline which enhances vehicle handling and stability, while also placing the batteries in an otherwise unused open and externally accessible packaging area. The universal chassis backbone structure is further advantageous by providing a uniform and central structure to allow for reconfiguration of the many vehicular drive train and engine configurations as previously discussed above.

Figure 7:
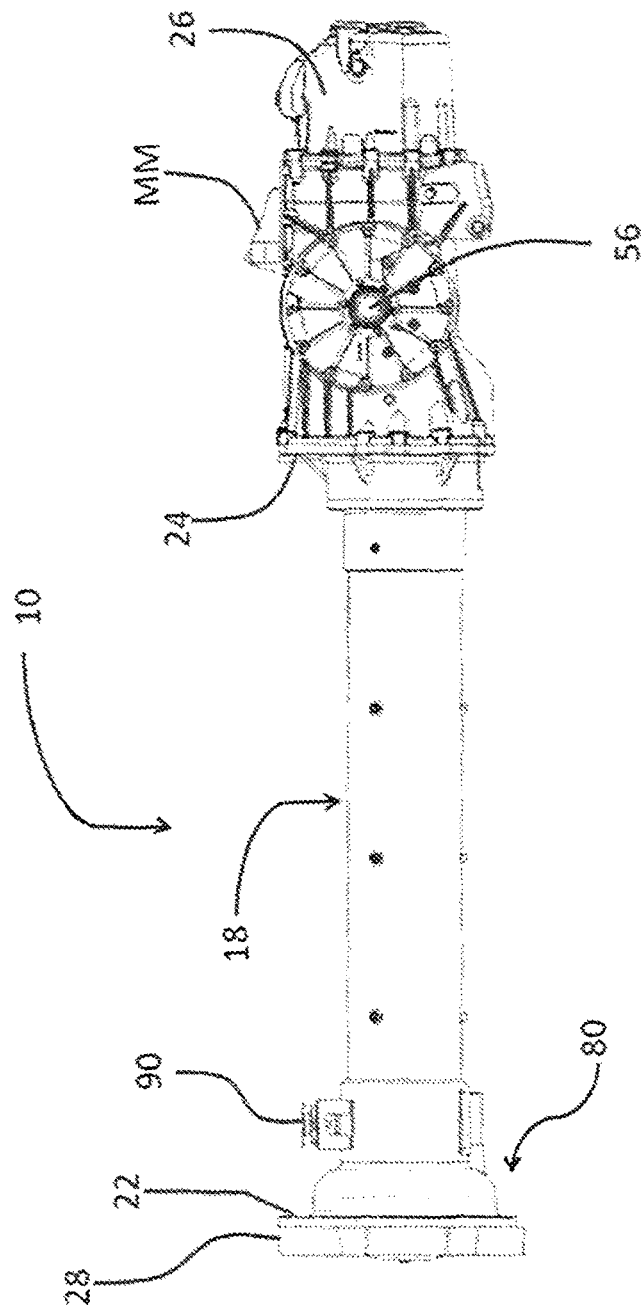
Figure 8A:
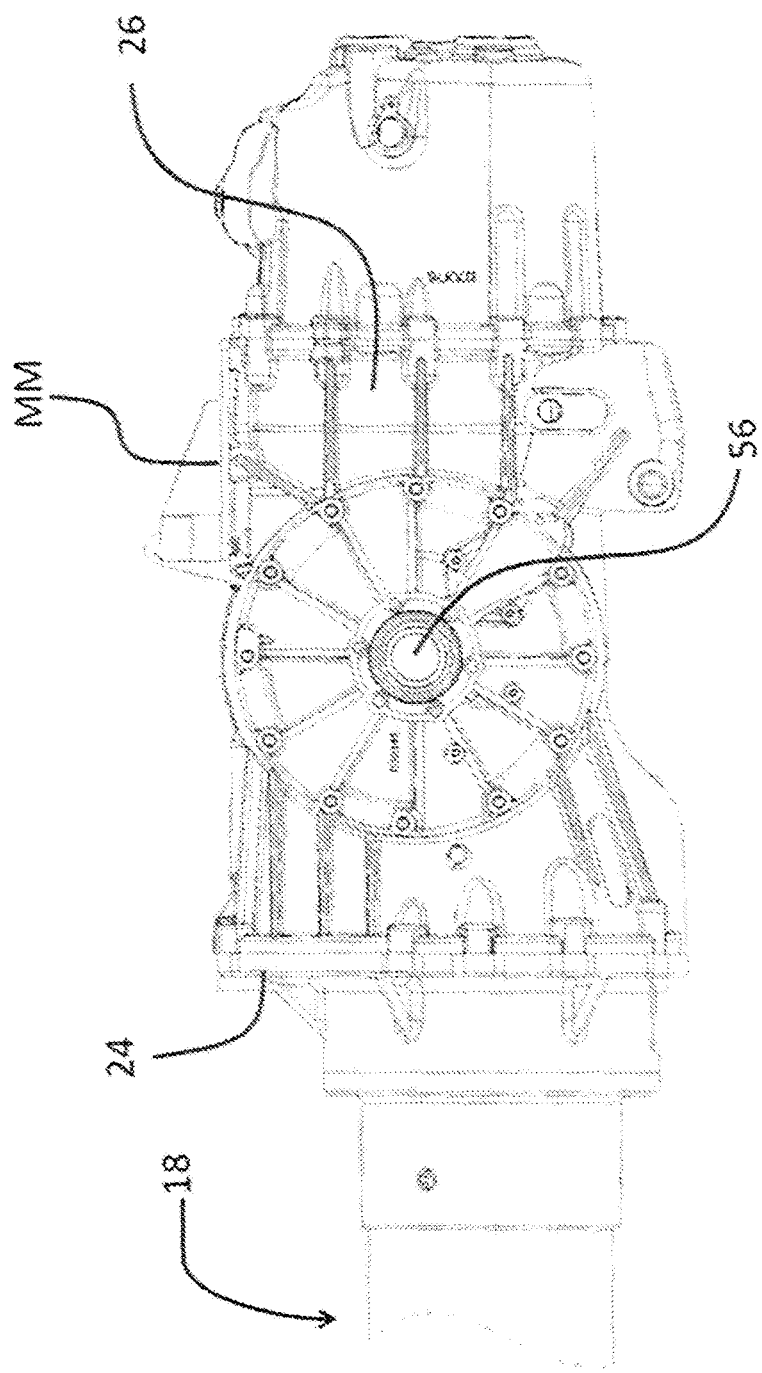
FIG. 8a is a detail side view of the transaxle attachment to the rear structure of FIG. 7.
Figure 8C:
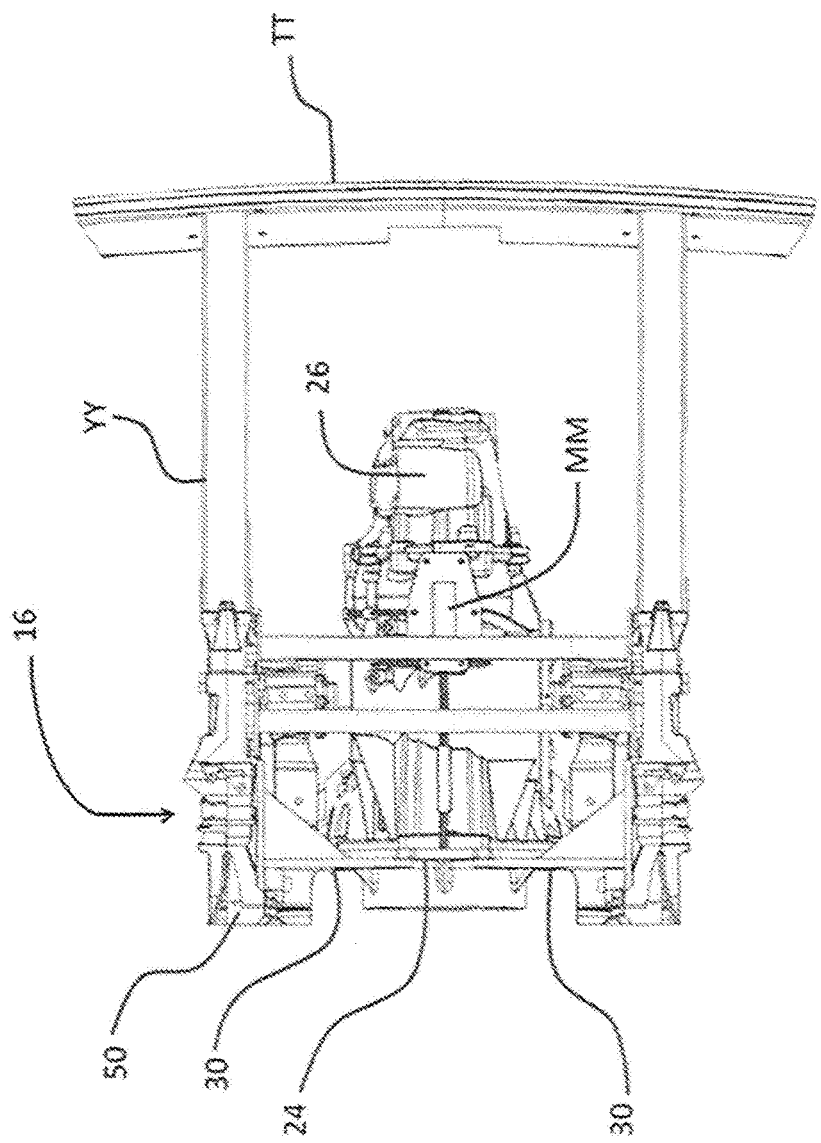
FIG. 8c is a detail top plan view of the transaxle and rear structure.
Figure 9A:
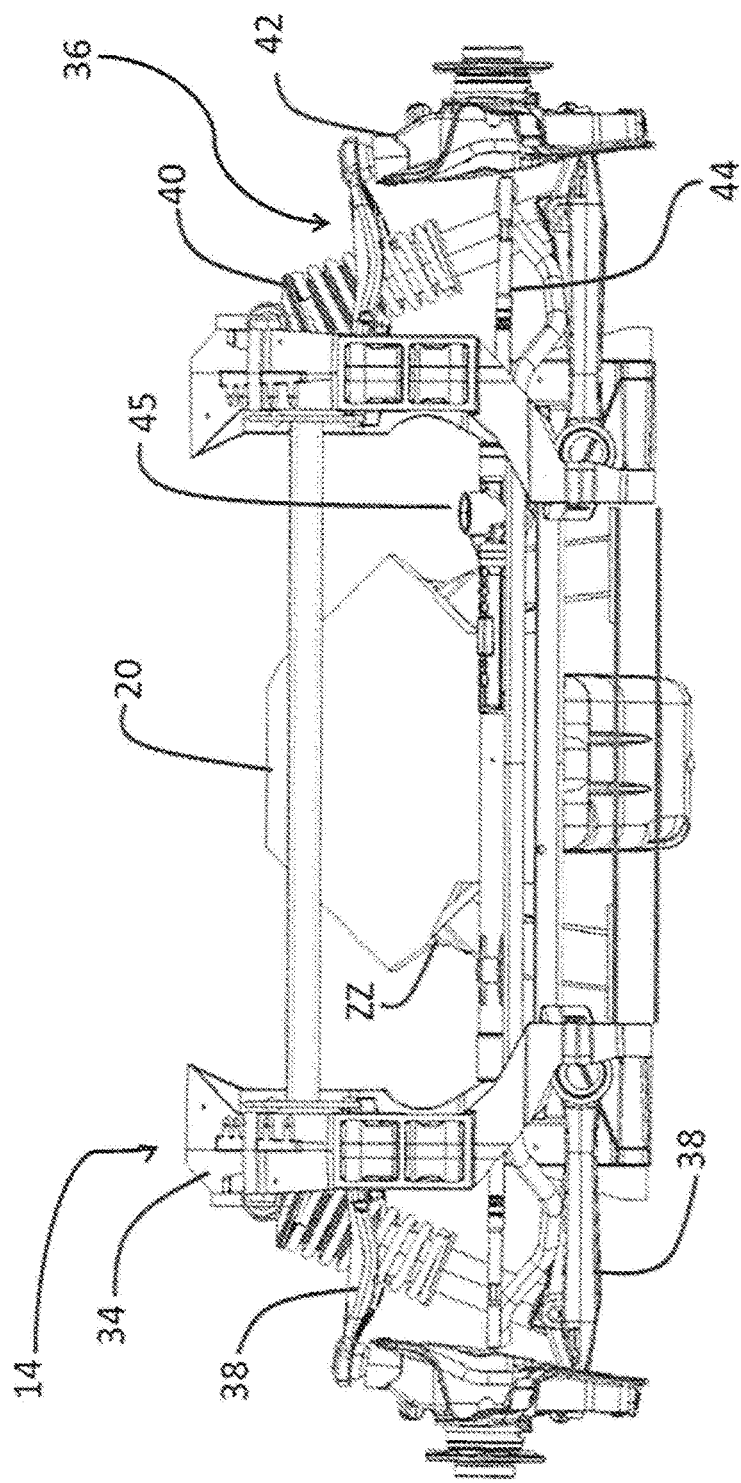
FIG. 9a is a partial front view of the front structure of the universal chassis of FIG. 3a and shown with suspension elements represented as being rigidly attached to the front structure.
Figure 9B:
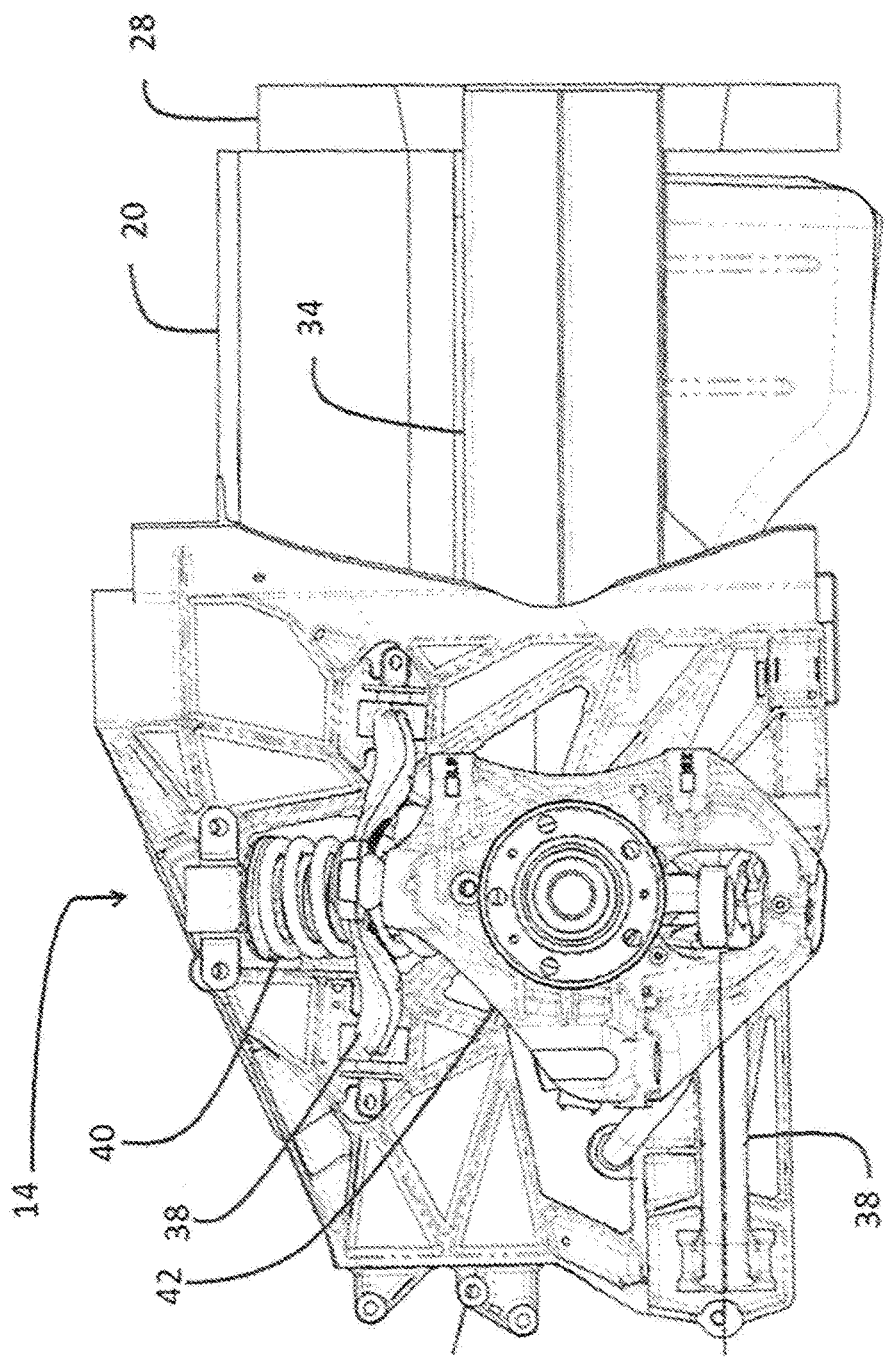
FIG. 9b is a partial side view of the front structure and engine.
Figure 9C:
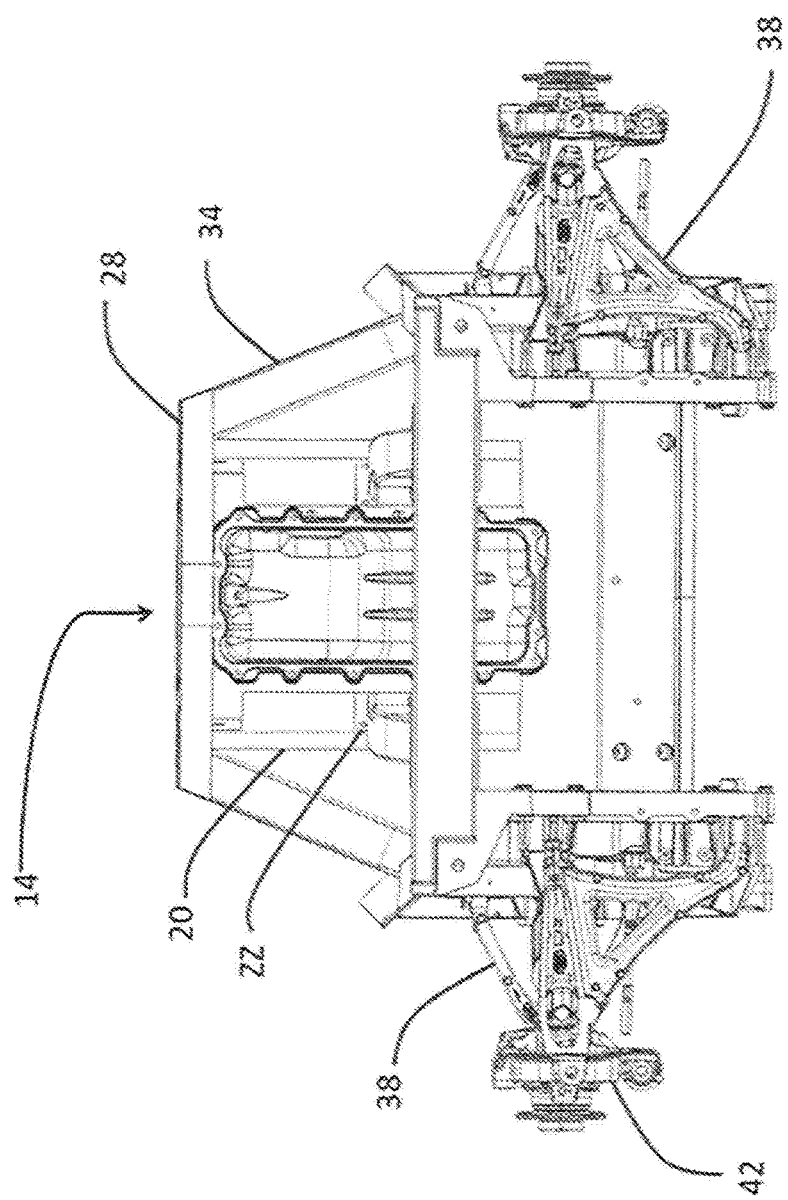
FIG. 9c is a partial bottom plan view of the front structure.

Fore and aft flanges 421 and 423 (see FIG. 33), respectively, allow for bolting or welding or other mechanical fastening connection of universal chassis backbone structure 413, including the associated battery storage compartment 379, directly to a flange attached to adjacent front structure 425 and rear structure 427 as is shown in various prior embodiments herein (see for example, FIG. 7).

FIGS. 36 and 37 illustrate a vehicular configuration employing a substantially T-shaped universal chassis backbone structure 451. Backbone structure 451 has a forward flange directly mounted to a front sub-frame or engine structure 453 and a rear flange or wall directly mounted to a rear engine, transaxle or sub-frame structure 455, as previously discussed hereinabove. Backbone structure 451 has a longitudinally elongated segment 457 and a laterally crossing segment 459 at a rear end thereof. It should be alternately appreciated, however, that the laterally crossing segment can be switched to a forward end of the backbone structure depending upon the vehicular packaging desired. A contiguously open and hollow energy storage compartment 461, also having a generally T-shape, is contained within the enclosed walls of backbone structure 451. Backbone structure 451 has either a combined inverted U-shaped structural section plus a bottom closeout plate 409 (see FIG. 35) or a cylindrical cross-sectional construction. A floor pan 463 or other body supporting structure can be directly mounted upon backbone structure 451 or more preferably, indirectly mounted to the universal chassis structure through body mounts. The laterally crossing segment 459 of the T-shaped backbone structure is designed to take advantage of an otherwise unused open and externally accessible packaging area under seat assembly 465. Seat assembly 465 may be a laterally elongated bench seat upon which two or more passengers can be seated.

FIGS. 38-40 illustrate an automotive vehicle employing a universal chassis backbone structure 501, directly mounted between front and rear structural and/or power train components 503 and 505, respectively. A vehicular body 507 is directly attached to backbone structure 501 or more preferably, indirectly mounted to the universal chassis backbone structure 501 through body mounts. In this embodiment, a hollow energy storage compartment 511, contained within backbone structure 501, holds fluid fuel, such as liquid gasoline, compressed natural gas, propane, gaseous hydrogen or other combustible fuel 513. Fuel 513 may be either directly contained within an enclosed wall section of backbone structure 501, as is shown in FIG. 39, or an additional fuel tank 515 is mounted within the universal chassis backbone structure 501, as is illustrated in FIG. 40. Standoffs 517 or insulators can optionally be disposed between an outer wall of fuel tank 515 and an inner surface of backbone structure 501 to reduce thermal and vibrational forces therebetween during vehicular use. A fuel filler hose 519 extends from fuel storage compartment 511 to an external access opening and a fuel line 521 extends from another section of fuel storage compartment 511 to a fuel pump 523 and a vehicular engine located at either of the front or rear structural sections 305 and 505, respectively. Moreover, a middle of the central backbone structure has a smaller lateral width than do either of the first and second structures on the ends thereof. This central location of the fluid fuel 513 within the closed wall universal chassis backbone structure 501 advantageously places the fuel furthest from a vehicle collision area thereby improving vehicle safety. The fuel is also advantageously contained within a structural member of the vehicle which is much stronger than a conventional fuel tank. The central location also improves vehicle weight distribution and handling. Moreover, packaging is optimized by placing the fuel in an otherwise unused area of the vehicle. Finally, the use of a battery or fluid fuel storage compartment in the universal chassis backbone structure allows for interchangeability of drive train and engine components without the need for customized and especially designed energy storage compartments and devices, thereby lowering the cost of the vehicle and adding to its manufacturing flexibility.

As another alternate arrangement, a flywheel energy storage device can be used instead of or in addition to one or more of the batteries. Examples of such flywheel arrangements are disclosed in the following U.S. Pat. Nos. 8,359,145 entitled "Flywheel Driveline and Control Arrangement" which issued to Bowman et al. on Jan. 22, 2013; 7,931,107 entitled "Vehicular Kinetic Energy Utilization Transmission System" which issued to Jones, Jr. on Apr. 26, 2011; and 7,540,346 entitled "Automotive Vehicle Employing Kinetic Energy Storage/Reuse Capability" which issued to Hu on Jun. 2, 2009; all of which are incorporated by reference herein. Such a flywheel energy storage device can be mounted within the universal chassis backbone structure, mounted directly to a front sub-frame structure or mounted directly to a rear sub-frame structure, depending upon the vehicle architecture desired.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

The invention claimed is:

1. An automotive vehicle chassis apparatus comprising:
 a central backbone structure enclosing an energy storage compartment therein;
 an engine;
 a first structure coupled adjacent to one end of the backbone structure and including the engine;
 a second structure coupled adjacent to an opposite end of the backbone structure and including at least one of: a transaxle and a wheel suspension;
 the central backbone structure being rigidly attached to the first and second structures such that ride, handling and impact crash loads are primarily transmitted between the first and second structures by the central backbone structure; and
 a middle of the central backbone structure has a smaller lateral width than do either of the first and second structures.

2. The chassis apparatus of claim 1, wherein the central backbone structure further comprises a longitudinally elongated section and a laterally crossing section, defining a substantially T-shape as viewed from above.

3. The chassis apparatus of claim 2, wherein the longitudinal and laterally crossing sections of the backbone structure are contiguously hollow and include the energy storage compartment in both sections thereof.

4. The chassis apparatus of claim 2, further comprising a seat assembly, wherein the laterally crossing section of the backbone structure is located under the seat assembly.

5. The chassis apparatus of claim 1, wherein the central backbone structure includes a closed-wall section of a substantially cylindrical cross-sectional shape.

6. The chassis apparatus of claim 1, wherein the central backbone structure includes a closed-wall section, the backbone structure further comprising a removable service plate, the backbone structure and plate together defining a substantially polygonal cross-sectional shape.

7. The chassis apparatus of claim 1, wherein the engine is an internal combustion engine and the energy storage compartment holds fluid fuel therein which is operably supplied to the engine.

8. The chassis apparatus of claim 1, wherein the engine is an electric traction motor and the energy storage compartment holds batteries therein which operably supply electricity to the engine.

9. The chassis apparatus of claim 1, further comprising:
 at least one of: a wire and a fluid line, extending within a longitudinal length of the backbone structure to the engine; and
 two wheels are coupled to the first structure and two wheels are coupled to the second structure.

10. The chassis apparatus of claim 1, wherein the engine is part of a hybrid powertrain including both an internal combustion engine and an electric traction motor.

11. An automotive vehicle chassis apparatus comprising:
 an elongated and single central chassis structure longitudinally spanning between and being the sole structural connection between front and rear wheel axes;
 an energy storage compartment located inside of the central chassis structure; and
 at least one of: a battery and fluid fuel, located in the energy storage compartment.

12. The chassis apparatus of claim 11, wherein the central structure further comprises a longitudinally elongated section and a laterally crossing section, defining a substantially T-shape as viewed from above.

13. The chassis apparatus of claim 12, wherein the longitudinal and laterally crossing sections of the central structure are contiguously hollow and include the energy storage compartment in both sections thereof.

14. The chassis apparatus of claim 12, further comprising a seat assembly, wherein the laterally crossing section of the central structure is located under substantially unused space beneath the seat assembly.

15. The chassis apparatus of claim 11, wherein the central structure includes a closed-wall section of a substantially cylindrical cross-sectional shape.

16. The chassis apparatus of claim 11, wherein the central structure includes a closed-wall section, the central structure further comprising a removable service plate, the central structure and plate together defining a substantially polygonal cross-sectional shape.

17. The chassis apparatus of claim 11, further comprising a body floor pan coupled to an upper surface of the central structure by spaced apart body mounts.

18. The chassis apparatus of claim 11, further comprising an internal combustion engine and the energy storage compartment holding fluid fuel therein which is operably supplied to the engine.

19. The chassis apparatus of claim 11, further comprising an electric traction motor, the energy storage compartment holding the battery and operably supplying electricity to the motor.

20. The chassis apparatus of claim 11, further comprising:
 an engine;
 at least one of: a wire and a fluid line, extending within a longitudinal length of the central structure to the engine;
 two wheels are coupled to a first sub-frame and two wheels are coupled to a second sub-frame, the central structure being the primary structural connection between the sub-frames; and
 at least a two passenger seat supported by the central structure.

21. The chassis apparatus of claim 11, further comprising an engine block directly coupled to the central chassis structure by a connector.

22. The chassis apparatus of claim 11, further comprising a separate fluid fuel tank concentrically located within the energy storage compartment and being spaced away from an internal surface of the central structure, and inlet and outlet fluid hoses connected to the tank.

23. The chassis apparatus of claim 11, wherein multiples of the battery are located in the central chassis structure.

24. The chassis apparatus of claim 11, further comprising a plate removeably attached to the central chassis structure to allow access to the battery.

25. The chassis apparatus of claim 11, wherein the central chassis structure has a substantially hollow and rectangular box cross-sectional shape.

26. The chassis apparatus of claim 11, further comprising:
a floor pan mounted to the central chassis structure, the battery being located below a centerline of the floor pan;
passenger seats mounted above the floor pan;
front wheels driven by an electric traction motor; and
rear wheels driven by an internal combustion engine.

27. An automotive vehicle chassis apparatus comprising:
a single central chassis structure spanning between a front set of wheels and a rear set of wheels, the central chassis structure further comprising a hollow longitudinally elongated segment and a hollow laterally crossing segment defining a substantially T-shape when viewed from above; and
a set of batteries being removeably located within the segments of the central chassis structure.

28. The chassis apparatus of claim 27, further comprising a passenger seat positioned above the laterally crossing segment.

29. The chassis apparatus of claim 27, further comprising a service plate removeably fastened to a bottom of the central chassis structure to allow removal of the batteries from below the vehicle.

30. The chassis apparatus of claim 27, wherein the central chassis structure has a closed-wall section and is the sole structural connection between the front and rear sets of wheels.

31. The chassis apparatus of claim 27, further comprising an electric traction motor located adjacent to an end of the central chassis structure, the batteries supplying electricity to the motor through a wire extending within the central chassis structure.

32. An automotive vehicle chassis apparatus comprising:
two front wheels and two rear wheels;
a central spine serving as a closed-cross-section structural connection between a common axis through the front wheels and a common axis through the rear wheels;
an electrical wire located within the central spine;
a floor pan mounted to the central spine;
passenger seats mounted above the floor pan; and
a battery located within the central spine below a portion of the floor pan.

33. The chassis apparatus of claim 32, further comprising a plate removeably attached to the central spine to allow access to the battery.

34. The chassis apparatus of claim 32, wherein the central spine has a substantially hollow and rectangular box cross-sectional shape.

35. The chassis apparatus of claim 32, further comprising a laterally extending segment adjacent a rear end of the central spine, wherein the central spine and the laterally extending segment define a T-shape when viewed from above.

36. The chassis apparatus of claim 32, further comprising an electric traction motor driving at least two of the wheels.

37. The chassis apparatus of claim 32, further comprising multiple additional batteries located within the central spine, at least one of which is connected to the wire, and an electronic control unit also being connected to the wire.

38. An automotive vehicle chassis apparatus comprising:
front and rear sets of wheels;
a central spine serving as the sole structural connection between the front and rear sets of wheels;
an electrical wire located within and extending the entire length of the central spine;
an engine located adjacent to one end of the spine;
a transaxle located adjacent to an opposite end of the spine;
a transmission shaft, coupling the engine to the transaxle, operably rotating within the spine; and
the electrical wire being routed within the spine but outboard of the transmission shaft.

39. The chassis apparatus of claim 38, wherein the engine is an internal combustion engine mounted directly to a front end of the spine via a mounting flange.

40. The chassis apparatus of claim 38, wherein the engine is an electric traction motor.

41. An automotive vehicle chassis apparatus comprising:
front and rear sets of wheels;
a central spine serving as the sole structural connection between the front and rear sets of wheels;
an electrical wire located within and extending the entire length of the central spine;
bearing assemblies located within the spine; and
a rotatable shaft journalled within the spine by the bearing assemblies;
the electrical wire extending between an inner surface of the spine and laterally outboard of the bearing assemblies.

42. An automotive vehicle chassis apparatus comprising:
front and rear sets of wheels;
a central spine serving as the sole structural connection between the front and rear sets of wheels;
an electrical wire located within and extending the entire length of the central spine;
a middle of the spine being cylindrical and hollow; and
a body floor pan coupled to an upper surface of the spine via spaced apart body mounts.

43. An automotive vehicle chassis apparatus comprising:
front and rear sets of wheels;
a central spine serving as the sole structural connection between the front and rear sets of wheels;
an electrical wire located within and extending the entire length of the central spine;
wherein the spine is universally adapted to fit in different vehicular configurations including front-wheel drive and rear-wheel drive vehicles, without change.

44. An automotive vehicle chassis apparatus comprising a single, closed section backbone structure universally adapted to be the primary structural connection between front and rear wheels for at least two of the following vehicular configurations, with only optional dimensional changes to the backbone structure:
(a) a front-mounted, hybrid internal combustion and electric traction motor engine, for a rear-wheel drive vehicle;
(b) a mid-mounted, hybrid internal combustion and electric traction motor engine, for a rear-wheel drive vehicle;
(c) a rear-mounted, hybrid internal combustion and electric traction motor engine, for a rear-wheel drive vehicle;
(d) a front-mounted, hybrid internal combustion and electric traction motor engine, for a front-wheel drive vehicle;
(e) a mid-mounted, hybrid internal combustion and electric traction motor engine, for a front-wheel drive vehicle;
(f) a rear-mounted, hybrid internal combustion and electric traction motor engine, for a front-wheel drive vehicle;

(g) a front-mounted internal combustion engine for a rear-wheel drive vehicle;
(h) a mid-mounted internal combustion engine for a rear-wheel drive vehicle;
(i) a rear-mounted internal combustion engine for a rear-wheel drive vehicle;
(j) a front-wheel drive and front transaxle vehicle;
(k) an internal combustion engine and rear transaxle vehicle;
(I) a front-mounted engine for a four-wheel drive vehicle;
(m) a mid-mounted engine for a four-wheel drive vehicle;
(n) a rear-mounted engine for a four-wheel drive vehicle;
(o) an electric traction motor engine for a front-wheel drive vehicle;
(p) an electric traction motor engine for a rear-wheel drive vehicle; and
(q) an electric traction motor engine for a four-wheel drive vehicle.

45. The chassis apparatus of claim 44, wherein the same backbone structure is adapted to attach to at least six of the vehicular configurations (a)-(q) but with only optional length changes to the backbone structure.

46. The chassis apparatus of claim 44, further comprising batteries removeably located within the backbone structure, and a wire connecting the batteries to the engine.

47. The chassis apparatus of claim 44, further comprising a fluid fuel storage compartment located within the backbone structure, and a fuel line coupling the compartment to the engine.

48. The chassis apparatus of claim 44, wherein the vehicular configuration includes the hybrid internal combustion and electric traction motor engine.

49. The chassis apparatus of claim 44, wherein the vehicular configuration includes: (k) the internal combustion engine and the rear transaxle vehicle, and (q) the electric traction motor engine for the four-wheel drive vehicle.

* * * * *